United States Patent
Makar et al.

(10) Patent No.: US 10,277,914 B2
(45) Date of Patent: Apr. 30, 2019

(54) MEASURING SPHERICAL IMAGE QUALITY METRICS BASED ON USER FIELD OF VIEW

(71) Applicant: QUALCOMM Incorporated, San Diego, CA (US)

(72) Inventors: Mina Ayman Saleh Yanni Makar, San Diego, CA (US); Ajit Deepak Gupte, Bangalore (IN); Ajit Venkat Rao, Bangalore (IN)

(73) Assignee: Qualcomm Incorporated, San Diego, CA (US)

( * ) Notice: Subject to any disclaimer, the term of this patent is extended or adjusted under 35 U.S.C. 154(b) by 38 days.

(21) Appl. No.: 15/586,124

(22) Filed: May 3, 2017

(65) Prior Publication Data

US 2017/0374375 A1 Dec. 28, 2017

(30) Foreign Application Priority Data

Jun. 23, 2016 (IN) .............................. 201641021607

(51) Int. Cl.
| | |
|---|---|
| *H04N 11/02* | (2006.01) |
| *H04N 19/44* | (2014.01) |
| *H04N 19/126* | (2014.01) |
| *H04N 19/154* | (2014.01) |
| *H04N 19/597* | (2014.01) |
| *G06T 7/00* | (2017.01) |
| *H04N 19/00* | (2014.01) |

(52) U.S. Cl.
CPC ........... *H04N 19/44* (2014.11); *G06T 7/0002* (2013.01); *H04N 19/00* (2013.01); *H04N 19/126* (2014.11); *H04N 19/154* (2014.11); *H04N 19/597* (2014.11); *G06T 2207/30168* (2013.01)

(58) Field of Classification Search
CPC ...................................................... H04N 19/44
USPC ....................................... 375/240.01–240.29
See application file for complete search history.

(56) References Cited

U.S. PATENT DOCUMENTS

| | | | |
|---|---|---|---|
| 6,100,897 A * | 8/2000 | Mayer ..................... | G06T 17/05 345/428 |
| 6,490,319 B1 * | 12/2002 | Yang ...................... | H04N 19/60 375/240.03 |
| 6,515,673 B1 * | 2/2003 | Hashimoto ............. | G06T 15/04 345/423 |
| 6,738,424 B1 | 5/2004 | Allmen et al. | |

(Continued)

OTHER PUBLICATIONS

International Search Report and Written Opinion—PCT/US2017/031115—ISA/EPO—dated Jul. 25, 2017—12 pp.

(Continued)

*Primary Examiner* — Leron Beck
(74) *Attorney, Agent, or Firm* — Shumaker & Sieffert, P.A.

(57) ABSTRACT

An example device for calculating a quality metric for video data includes a memory configured to store a spherical image of the video data, and one or more processors implemented using discrete logic circuitry and configured to determine a user field of view for the spherical image, determine weighting values for pixels of the spherical image based on the user field of view; and calculate a quality metric for the user field of view of the spherical image using the weighting values, wherein calculating the quality metric comprises applying the weighting values to values for the pixels.

29 Claims, 14 Drawing Sheets

(56) References Cited

U.S. PATENT DOCUMENTS

| | | | | |
|---|---|---|---|---|
| 7,675,549 | B1* | 3/2010 | Brower | H04N 1/00244 |
| | | | | 348/157 |
| 8,259,994 | B1* | 9/2012 | Anguelov | G06K 9/00664 |
| | | | | 382/100 |
| 8,369,579 | B2 | 2/2013 | Frigerio | |
| 8,396,269 | B2 | 3/2013 | Henderson et al. | |
| 8,693,537 | B2* | 4/2014 | Wang | H04N 19/176 |
| | | | | 375/240.08 |
| 8,718,145 | B1* | 5/2014 | Wang | H04N 19/12 |
| | | | | 375/240.02 |
| 9,450,845 | B2* | 9/2016 | Martins | H04L 41/5009 |
| 2002/0141659 | A1* | 10/2002 | Florin | G06T 15/205 |
| | | | | 382/285 |
| 2003/0227977 | A1* | 12/2003 | Henocq | H04N 19/61 |
| | | | | 375/240.26 |
| 2006/0034514 | A1* | 2/2006 | Horn | A61B 1/00009 |
| | | | | 382/181 |
| 2006/0152585 | A1* | 7/2006 | Bourret | G06T 7/001 |
| | | | | 348/180 |
| 2006/0268980 | A1* | 11/2006 | Le Dinh | H04N 17/004 |
| | | | | 375/240.01 |
| 2007/0074251 | A1* | 3/2007 | Oguz | H04N 19/105 |
| | | | | 725/45 |
| 2008/0002041 | A1 | 1/2008 | Chuang et al. | |
| 2008/0129732 | A1* | 6/2008 | Johnson | G06T 7/0002 |
| | | | | 345/424 |
| 2008/0198920 | A1* | 8/2008 | Yang | H04N 19/597 |
| | | | | 375/240.01 |
| 2008/0297586 | A1* | 12/2008 | Kurtz | H04N 7/147 |
| | | | | 348/14.08 |
| 2008/0310740 | A1* | 12/2008 | Strom | G06T 9/00 |
| | | | | 382/233 |
| 2010/0086063 | A1* | 4/2010 | Haskell | H04N 19/176 |
| | | | | 375/240.27 |
| 2011/0007270 | A1* | 1/2011 | Sarver | A61B 3/1015 |
| | | | | 351/206 |
| 2011/0090950 | A1* | 4/2011 | Bush | H04N 19/196 |
| | | | | 375/240.02 |
| 2012/0127297 | A1* | 5/2012 | Baxi | G06T 7/0002 |
| | | | | 348/79 |
| 2012/0275511 | A1 | 11/2012 | Shemer et al. | |
| 2015/0321103 | A1* | 11/2015 | Barnett | G06T 19/006 |
| | | | | 345/419 |
| 2016/0021373 | A1 | 1/2016 | Queru | |

OTHER PUBLICATIONS

Vladyslav Zakharchenko et al., "Quality Metric for Spherical Panoramic Video," SPIE—International Society for Optical Engineering. Proceedings, SPIE—International Society for Optical Engineering, US, vol. 9970, Sep. 14, 2016 (Sep. 14, 2016), pp. 99700C-99700C, XP060079504, 9 pages. ISSN: 0277-786X, DOI: 10.1117/12.2235885 ISBN: 978-1-5106-0753-8 the whole document.

Youvalari R., "360-Degree Panoramic Video Coding," Tampere University of Technology, Aug. 1, 2016 (Aug. 1, 2016), XP55340257, 68 pages. Retrieved from the Internet:URL:http://dspace.cc.tut.fi/dpub/bitstream/handle/123456789/24326/ghaznavi.pdf?sequence=1&isAllowed=y [retrieved on Jan. 30, 2017] the whole document.

Response to Written Opinion of International Application No. PCT/US2017/031115 filed Oct. 31, 2017, 7 pp.

Witten Opinion of International Application No. PCT/US2017/031115 dated Jan. 4, 2018, 8 pp.

International Preliminary Report on Patentability of International Application No. PCT/US2017/031115 dated Feb. 27, 2018, 11 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

ITU-T H.263, Series H: Audiovisual and Multimedia Systems, Infrastructure of audiovisual services—Coding of moving video, Video coding for low bit rate communication, The International Telecommunication Union. Jan. 2005, 226 pp.

Richardson I-E., "Chapter 6: H.264/MPEG4 Part 10", H.264 and MPEG-4 Video Compression, Oct. 17, 2003, pp. 159-223.

Yu et al., "A Framework to Evaluate Omnidirectional Video Coding Schemes", 2015 IEEE International Symposium on Mixed and Augmented Reality, Department of Electrical Engineering Stanford University, 2015, pp. 31-36. (The year of publication is sufficiently earlier than the effective U.S. filed and any foreign priority date so that the particular month of publication is not in issue.).

Li et al., "Content-weighted video quality assessment using a three-component image model", Journal of Electronic Imaging 19(1), 011003 (Jan.-Mar. 2010), 9 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

* cited by examiner

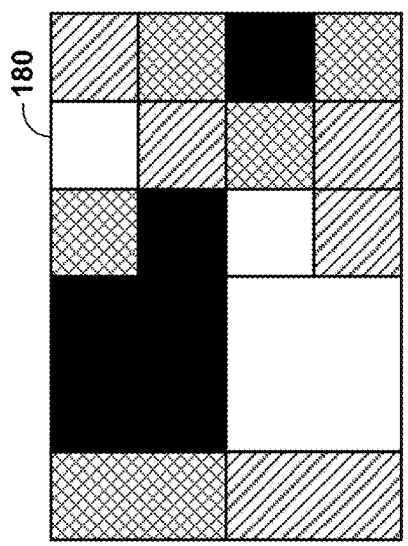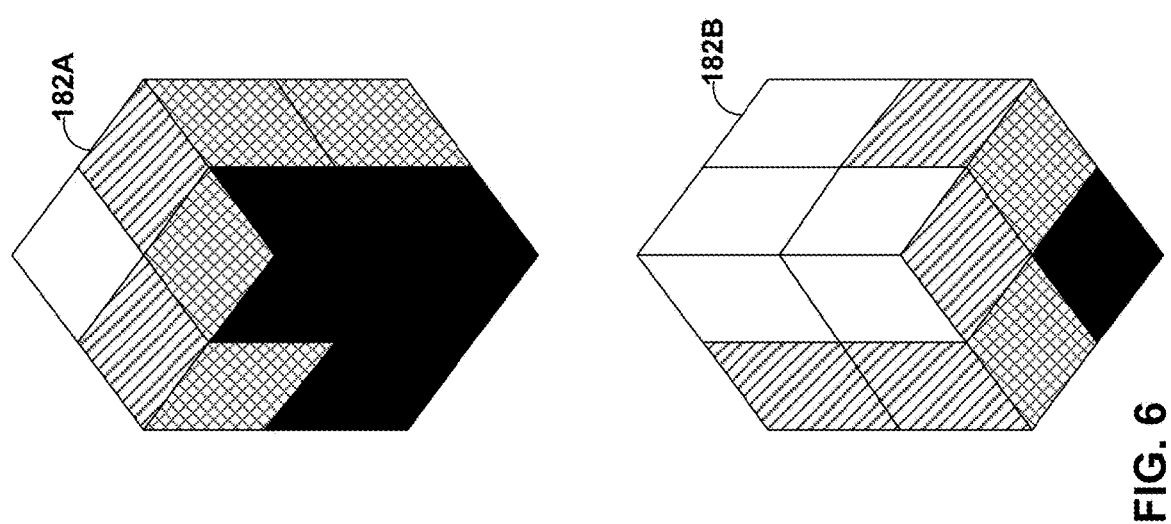
FIG. 6

Spatial Weighting of Viewport PSNR

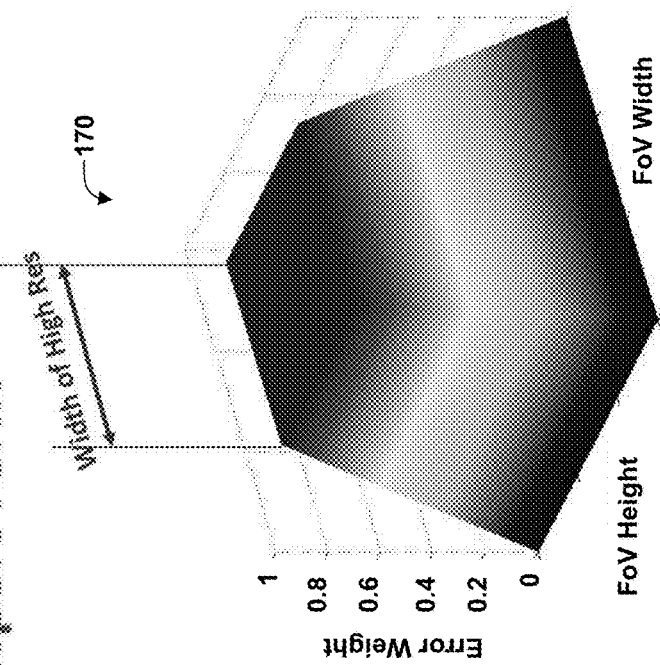

- Ideal spatial weighting requires eye-tracking data
- We can exploit that users usually focus on the center of the screen
- We propose the shown weights, which depend on 1 parameter: Width of High Res (in simulations, we use Width of High Res = 60%)
- Error weight is multiplied by the error used in PSNR calculation $$Spatially\ Weighted\ PSNR(t) = 10 log_{10}\left(\cfrac{1}{\cfrac{1}{WH}\sum_{x=1}^{W}\sum_{y=1}^{H}\left[Error\ Weight(x,y) * \left(I_1(x,y,t) - I_2(x,y,t)\right)\right]^2}\right)$$

MEASURING SPHERICAL IMAGE QUALITY METRICS BASED ON USER FIELD OF VIEW

This application claims priority to India provisional application no. 201641021607, filed Jun. 23, 2016, the entire content of which is hereby incorporated by reference.

TECHNICAL FIELD

This disclosure relates to processing of media data, such as video data.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265, also referred to as High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure is directed to techniques for calculating a quality metric based on users' field of view (FoV) for video data. In particular, these techniques may be applied when users direct their focus to a particular portion of a large canvas, such as a three-dimensional canvas that partially or fully envelops the users' heads (which may be achieved using screens or head-mounted optics). Test data may be used to determine the users' FoV. Then, the video data may be encoded and prepared (e.g., for storage and/or transmission) using a set of characteristics (such as spatial resolutions for different regions of the canvas, bitrates for different regions of the canvas (which may be achieved using various quantization parameters), or the like). Subsequently, a peak signal to noise ratio (PSNR) calculation may be performed to calculate a quality metric for video data encoded, prepared, and decoded using the set of characteristics, where the PSNR calculation is based on the users' FoV. For example, the PSNR calculation may involve weighting values of pixel errors in or near the users' FoV higher than pixel errors outside of the users' FoV.

In one example, a method of calculating a quality metric for video data includes determining a user field of view for a spherical image of the video data, determining weighting values for pixels of the spherical image based on the user field of view, and calculating a quality metric for the user field of view of the spherical image using the weighting values, wherein calculating the quality metric comprises applying the weighting values to values for the pixels.

In another example, a device for calculating a quality metric for video data includes a memory configured to store a spherical image of the video data, and one or more processors implemented using discrete logic circuitry and configured to determine a user field of view for the spherical image, determine weighting values for pixels of the spherical image based on the user field of view, and calculate a quality metric for the user field of view of the spherical image using the weighting values, wherein calculating the quality metric comprises applying the weighting values to values for the pixels.

In another example, a device for calculating a quality metric for video data includes means for determining a user field of view for a spherical image of the video data, means for determining weighting values for pixels of the spherical image based on the user field of view, and means for calculating a quality metric for the user field of view of the spherical image using the weighting values, wherein the means for calculating the quality metric comprises means for applying the weighting values to values for the pixels.

In another example, a computer-readable storage medium has stored thereon instructions that, when executed, cause a processor to determine a user field of view for a spherical image of the video data, determine weighting values for pixels of the spherical image based on the user field of view, and calculate a quality metric for the user field of view of the spherical image using the weighting values, wherein the instructions that cause the processor to calculate the quality metric comprise instructions that cause the processor to apply the weighting values to values for the pixels.

The details of one or more examples are set forth in the accompanying drawings and the description below. Other features, objects, and advantages will be apparent from the description and drawings, and from the claims.

BRIEF DESCRIPTION OF DRAWINGS

FIG. 6 is a conceptual diagram illustrating a correspondence between an example canvas and corresponding cube map views.

FIG. 9 is a conceptual diagram illustrating an example technique for calculating a quality metric in accordance with the techniques of this disclosure.

DETAILED DESCRIPTION

Figure 1:
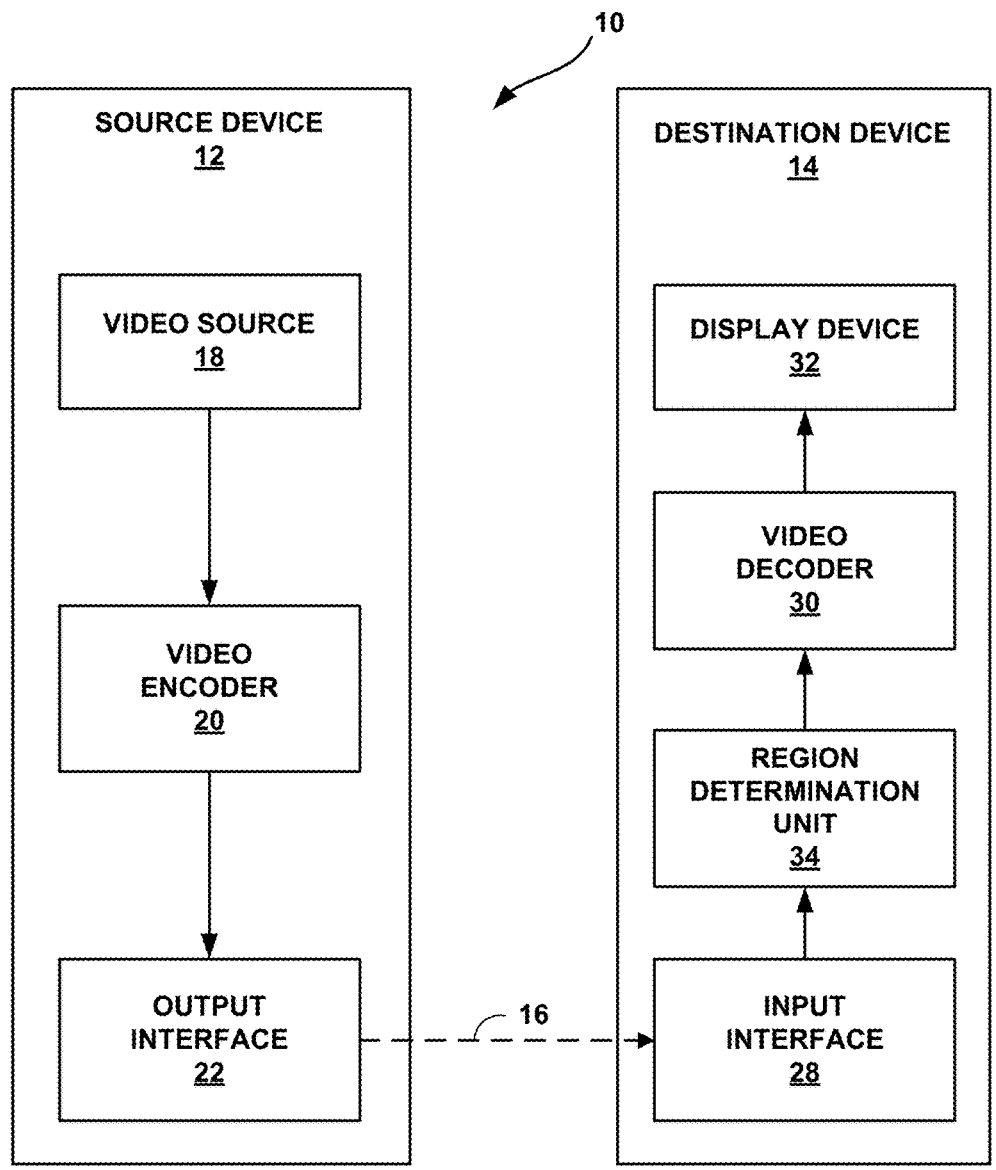
FIG. 1 is a block diagram illustrating an example video encoding and decoding system that may utilize techniques for transferring multi-resolution media data.

In general, this disclosure is directed to techniques for calculating a quality metric based on users' field of view (FoV) for spherical video data. Spherical video data refers to video data that partially or fully surrounds a viewer's head, e.g., for virtual reality applications or other similar scenarios in which a user may move his or her head to see different parts of an image canvas that cannot be seen when directing focus at a single point of the canvas. In particular, these techniques may be applied when users direct their focus to a particular portion of a large canvas, such as a three-dimensional canvas that partially or fully envelops the users' heads (which may be achieved using screens or head-mounted optics). Test data may be used to determine the users' FoV.

Then, the video data may be encoded and prepared (e.g., for storage and/or transmission) using a set of characteristics (such as spatial resolutions for different regions of the canvas, bitrates for different regions of the canvas (which may be achieved using various quantization parameters), or the like). Subsequently, one or more quality metric calculations, such as a peak signal to noise ratio (PSNR) calculation, may be performed to calculate one or more quality metrics for video data encoded, prepared, and decoded using the set of characteristics, where the PSNR calculation is based on the users' FoV. For example, the PSNR calculation may involve weighting values of pixel errors near the center of the users' FoV higher than pixels near the edges of the users' FoV.

This disclosure recognizes that different quality metrics may be needed for spherical video than conventional PSNR as used for planar video. This is because spherical video involves extra steps compared to planar video, such as geometry mapping and viewport rendering. Some quality metrics may be considered to select one of a variety of different geometry mapping techniques (such as simultaneous multi-resolution (SMR), Pyramid, Offset CubeMap, or the like). The metrics may then be used to adjust parameters of the selected mapping technique (e.g., SMR) to provide a high quality. Then, the metrics may further be used to select encoding techniques to encode the spherical video data. This disclosure describes example techniques for calculating such quality metrics that may serve these and other purposes.

Certain quality metric calculation techniques of this disclosure include spatially weighting the values of certain pixel errors in an image canvas, e.g., pixels within a user's FoV. In general, it may be assumed that a user's focus is directed to the center of the FoV. Additionally or alternatively, pixel error values may be temporally weighted, which may account for the fact that users cannot focus on certain details (e.g., highly textured images) during fast head motion. In some examples, spatial and temporal weighting may be combined for calculation of quality metrics.

In general, this disclosure describes three types of quality metrics. A first quality metric is Field of View (FoV) Pixel Coverage. This quality metric may be used to measure the effect of viewing low-resolution layers for a certain user head-movement trajectory. This quality metric may be calculated independently of video content and video codec that is ultimately used to encode (and decode) the video data. A second quality metric is a scaling PSNR, which measures the effect of viewing low resolution layers for a certain head movement trajectory and based on content of the video data. The scaling PSNR may isolate the effect of upsampling of low-resolution layers from the effect of video coding artifacts. The scaling PSNR may be dependent on video content, but this calculation is independent from the video codec used to encode the video data. A third quality metric is a viewpoint PSNR. The viewpoint PSNR may be used to measure the combined effect of viewing low-resolution layers with video coding artifacts. The viewpoint PSNR may be dependent on the video content and video coding parameters. Coding schemes may be compared using rate-distortion (R-D) curves.

The techniques of this disclosure may be used in conjunction with techniques related to transmission (e.g., sending and/or receiving) of media data (such as video data) coded at various levels of quality for different regions at which the media data is to be played back. For example, the techniques of this disclosure may be used by a client device that includes a panoramic display, such as a display that partially or fully envelopes a viewer. In general, the display is configured such that a visual focus of a user is directed to only a portion of the display at a given time.

A client device including or communicatively coupled to such a display may retrieve higher quality media data (such as media data having a larger spatial resolution) for regions of the display at which the user is directing focus, slightly lower quality media data for regions of the display that spatially neighbor the regions at which the user is directing focus, and even lower quality media data for other regions of the display.

Today, many smartphones include decoders capable of decoding 4 k (e.g., 3840×2160 pixels) video data at 30 frames per second. Some smartphones even include decoders capable of decoding 4 k video data at 60 frames per second. Good quality panoramic video data requires a much larger canvas (that is, full display area), however. For example, a 6 k (e.g., 6144×3072 pixels) canvas has been shown to provide significant visual quality gains compared to a 4 k canvas for panoramic playback. With better optics in head mounted displays (HMDs) and better content, visual quality may be significantly improved with higher resolution. This is because the human eye can resolve up to $\frac{1}{60}^{th}$ of a degree at the center of the field of vision.

This disclosure describes techniques that may be used to encode video that that is ultimately decoded using partial decoding techniques. In particular, a decoder of a client device may decode the content that the user is observing (that is, the content at which the visual focus of the user is directed) at a desired resolution, and other content may be decoded at lower resolution(s). In this manner, these techniques may reduce data bandwidth. Such may be beneficial, because the average Internet connection bandwidth today in the U.S. is around 5 mbps, whereas the bandwidth needed to receive 4 k video at 30 frames per second is approximately 20-30 mbps.

In a typical partial decode scheme, panoramic video is coded in the form of two spatial layers. A base layer is coded using inter- and intra-prediction. The base layer is sent and decoded for an entire canvas (e.g., an entire spherical display). An enhancement layer may be predicted using both inter- and intra-prediction. The enhancement layer may be sent and decoded only as much as needed, based on the user's current head position. In such a setup, if the user has a sudden head movement, the low resolution base layer video will be displayed until the enhancement layer video for the new view can be displayed. The latency to display the enhancement layer video can be kept small with low delay temporal prediction schemes (such as small intervals between I-frames, or even all intra-coding), but at a trade-off between latency and compression efficiency. When higher resolution content is streamed based on direction of viewing, the latency to display the higher resolution may be relatively high.

Furthermore, in typical partial decode schemes, inter-layer prediction may or may not be used. Scalable coding with inter-layer prediction may or may not be supported by certain decoding devices. If inter-layer prediction is used and the enhancement layer does not use temporal prediction, latency for viewing the high resolution video can be avoided. Again, there is a trade-off between latency and compression efficiency. The bit rate increase can be very high in the absence of temporal prediction.

Typically, the enhancement layer panorama is divided into multiple tiles (or regions) that are coded spatially and temporally independently of each other. A video encoder may enforce additional constraints to disallow inter-tile temporal prediction. A typical field of view (FoV) is approximately 90×90 degrees. In a point-to-point connection, enhancement layer data may be accessed on demand.

Typical partial decoding schemes may encounter certain limitations. For example, when a user turns his/her head to view content in another direction, lower quality content is displayed for some amount of time. In conventional schemes, the quality drop is drastic. For example, 6 k resolution video data may drop to 1080p resolution, which is a quality reduction on the order of nine times. The delay in displaying higher quality content can be quite large, as well, e.g., a few seconds in a streaming scenario.

The techniques of this disclosure may be used to implement a multiple storage scheme based on tile (or region) combinations, where loss in coding efficiency may be avoided by combining smaller tiles into larger tiles at the encoder. This may result in increased storage redundancy, but improve overall user experience and coding efficiency when the visual focus of the user is directed at a position of the display that can be represented using the larger tiles. In particular, a video encoder may use these techniques to compare various combinations of tiles or regions to determine which combinations yield better quality metrics (e.g., spatially weighted PSNR values).

FIG. 1 is a block diagram illustrating an example video encoding and decoding system 10 that may utilize techniques for transferring multi-resolution (or generally, multi-quality) media data. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, display device 32, and region determination unit 34. In accordance with this disclosure, video encoder 20 of source device 12 may be configured to apply certain aspects of the techniques for calculating quality metrics for video data to, e.g., determine appropriate encoding characteristics for prepared video data. Region determination unit 34 and video decoder 30 of destination device 14 may also be configured to perform various aspects of the techniques of this disclosure. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for transferring multi-resolution media data may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard, also referred to as ITU-T H.265. Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video coding standards include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP). In general, video decoder 30 performs a substantially similar, albeit reciprocal, process to that performed by video encoder 20 to decode encoded data.

Video encoder 20 and video decoder 30 each may be implemented as any of a variety of suitable encoder or decoder circuitry, e.g., including one or more processors, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Hence, an encoder or decoder may be formed by any of a variety of integrated processing circuitry comprising one or more processors implemented as fixed hardware processing circuitry, programmable processing circuitry and/or a combination of both fixed and programmable processing circuitry. Each of video encoder 20 and video decoder 30 may be included in one or more encoders or decoders, either of which may be integrated as part of a combined encoder/decoder (CODEC) in a respective device.

Video encoder 20 may further send syntax data, such as block-based syntax data, picture-based syntax data, and sequence-based syntax data, to video decoder 30, e.g., in a picture header, a block header, a slice header, or other syntax data, such as a sequence parameter set (SPS), picture parameter set (PPS), or video parameter set (VPS).

In accordance with the techniques of this disclosure, output interface 22 and input interface 28 may correspond to network interfaces, such as network interface cards (NICs) implementing one or more network protocols, such as Ethernet. Computer-readable medium 16 may correspond to a network connection, which may traverse a private or public network, such as the Internet.

Figure 3A:
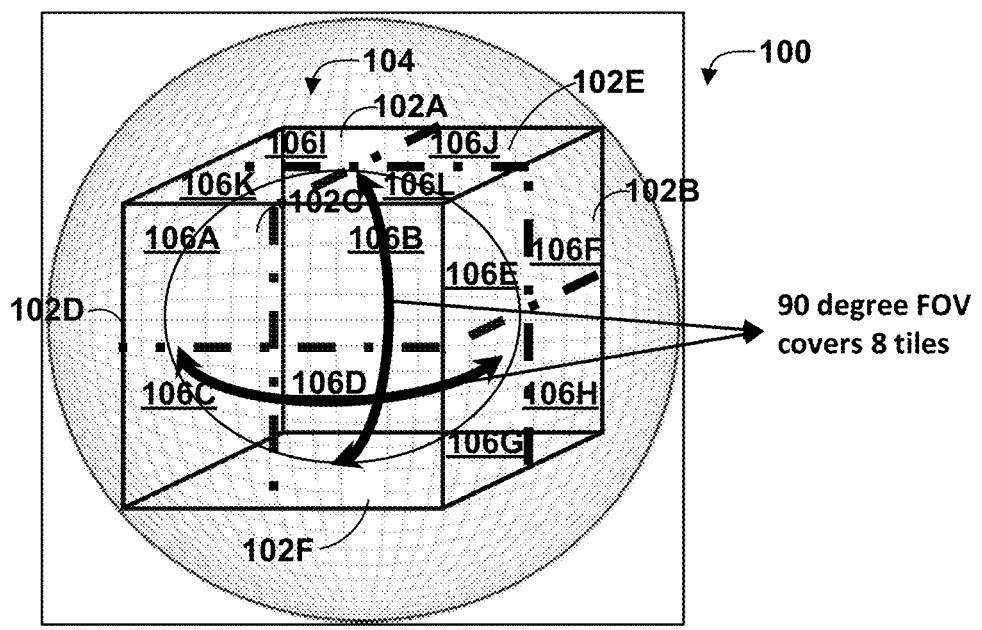
FIGS. 3A and 3B are conceptual diagrams illustrating representations of models for displays used to present panoramic video data.

Display device 32 may correspond to a panoramic display. For example, display device 32 may correspond to a head-mounted display (HMD) or one or more screens that substantially or fully envelop a user. Region determination unit 34 may be configured to determine a plurality of regions of display device 32. For example, as shown in FIG. 3A, discussed in greater detail below, display device 32 may include a plurality of tiles, e.g., one or more portions of cube faces corresponding to a spherical display (or display that can simulate a spherical display, such as an HMD).

As discussed herein, region determination unit 34 may determine one or more of the regions at which a visual focus of the user (not shown in FIG. 1) is directed. In accordance with the techniques of this disclosure, region determination unit 34 may cause input interface 28 to retrieve video data having a first quality (e.g., spatial resolution) for a first subset of regions of display device 32 at which a visual focus of a user is directed, retrieve video data having a second quality for a second subset of the plurality of regions that neighbor the first subset of the plurality of regions, where the second quality is lower than the first quality, and retrieve video data having a third quality for a third subset of the plurality of regions that is outside the first subset and the second subset, where the third quality is lower than the second quality.

Source device 12 and destination device 14 may be configured to transfer video data according to the techniques of this disclosure. For example, video encoder 20 and video decoder 30 may implement simultaneous multi-resolution (SMR) techniques. SMR is a new approach to partial decoding techniques. In accordance with SMR, independently coded multiple resolution streams may be transferred, as compared to the scalable coding approach used in traditional partial decode schemes. SMR may allow for gradual quality drop off over a range of regions or tiles positioned progressively further away from the user's current viewpoint.

In particular, video encoder 20 may encode data for the full panorama at multiple resolutions, e.g., 6 k, 4 k, HD (1080p), and 720p. That is, video encoder 20 may encode video data for each region (or "tile") at each of these multiple resolutions. In this manner, tile granularity may be the same for each resolution. Video encoder 20 may avoid inter-layer dependency when encoding the various resolutions. Thus, video decoder 30 may decode video data for the tiles at different resolutions in a selective manner (e.g., as selected by region determination unit 34). For example, region determination unit 34 may select a highest available resolution for regions at a center of the user's current viewpoint. Moving away from the center of the current viewpoint, the decoded resolution may drop gradually. That is, region determination unit 34 may select resolutions that get proportionally lower for regions (tiles) that are further from the center of the current viewpoint. Thus, video decoder 30 may decode video data at the lowest available resolution for tiles behind the user's current viewpoint.

Video encoder 20, video decoder 30, and region determination unit 34 each may be implemented as any of a variety of suitable fixed and/or programmable circuitry, as applicable, such as one or more microprocessors, digital signal processors (DSPs), application specific integrated circuits (ASICs), field programmable gate arrays (FPGAs), discrete logic circuitry, software, hardware, firmware, or any combinations thereof. When functionality is implemented in software or firmware, instructions for the software or firmware are generally stored in a hardware-based computer-readable storage medium and executed by one or more processors, which again are implemented using logic circuitry. Each of video encoder 20 and video decoder 30 may be included in one or more encoders or decoders, either of which may be integrated as part of a combined video encoder/decoder (CODEC). A device including video encoder 20, video decoder 30, and/or region determination unit 34 may comprise an integrated circuit, a microprocessor, and/or a wireless communication device, such as a cellular telephone.

Destination device 14 may include a memory configured to store retrieved video data, such as a hard disk and/or a buffer. Such memory may be included within video decoder 30, region determination unit 34, or elsewhere within destination device 34.

In this manner, destination device 14 (and region determination unit 34) represent examples of a device including a display interface coupled to a display, a memory configured to store video data, and one or more processors configured to determine a plurality of regions of video data to be displayed via the display, retrieve video data having a first quality for a first subset of the plurality of regions at which a visual focus of a user is directed, retrieve video data having a second quality for a second subset of the plurality of regions that neighbor the first subset of the plurality of regions, wherein the second quality is lower than the first quality, and retrieve video data having a third quality for a third subset of the plurality of regions that is outside the first subset and the second subset, wherein the third quality is lower than the second quality.

Figure 2:
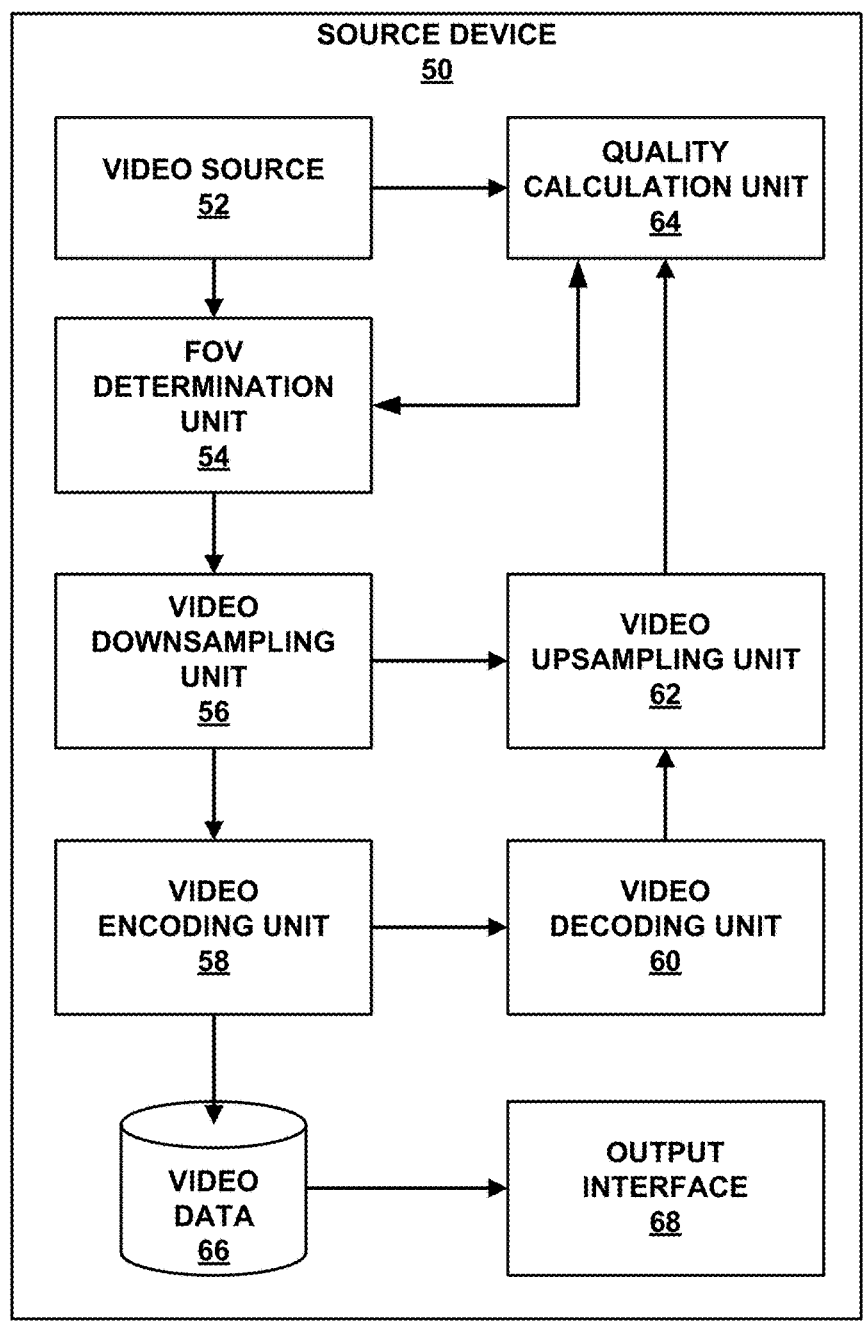
FIG. 2 is a block diagram illustrating an example source device 50 that may be configured to perform the techniques of this disclosure.

FIG. 2 is a block diagram illustrating an example source device 50 that may be configured to perform the techniques of this disclosure. Source device 50 may correspond to source device 12 of FIG. 1.

In this example, source device 50 includes video source 52, field of view (FoV) determination unit 54, video downsampling unit 56, video encoding unit 58, video decoding unit 60, video upsampling unit 62, quality calculation unit 64, video data 66, and output interface 68. Video data 66 may be stored in a memory, that is, a computer-readable storage medium, such as a hard disk, flash memory, hard drive, Blu-ray discs, DVDs, CD-ROMs, flash memory, volatile or non-volatile memory, or any other suitable digital storage media for storing encoded video data.

Any or all of FoV determination unit 54, video downsampling unit 56, video encoding unit 58, video decoding unit 60, video upsampling unit 62, quality calculation unit 64, and video data 66 may be implemented in hardware, software, or firmware. When implemented in software or firmware, it should be understood that source device 50 further includes requisite hardware, such as a memory for storing software and/or firmware instructions and one or more processing units, implemented using digital logic circuitry, configured to execute the instructions.

In this example, video source 52 provides raw video data to FoV determination unit 54, as well as to quality calculation unit 64. As discussed above with respect to video source 18 of FIG. 1, video source 52 may represent, for example, an external source device (such as a camera) or an internal source device (such as a computer-readable storage medium or a unit that generates, e.g., computer graphics). In some examples, source video data provided by video source 52 may include both captured video data and computer graphics.

FoV determination unit 54, in this example, is configured to determine a user FoV for an image of video data from video source 52. In general, FoV determination unit 54 may determine the user FoV based on a user's head trajectory and a previous FoV of a previous image. FoV determination unit 54 may implement any of a variety of trajectory determination techniques, such as, for example, monitoring of accelerometers of head mounted user equipment, camera monitoring of the user and the user's focus, or the like.

In accordance with the techniques of this disclosure, source device 50 generally determines quality for one or more spherical images of video data based on the user FoV. As discussed above, in one example, quality calculation unit 64 of source device 50 calculates the quality of a spherical image based on the user's head movement trajectory and the effect of viewing low resolution layers. In this example, the quality metric may correspond to a number of pixels included within the user FoV based on the user's head trajectory, independent of video content and video codec. That is, quality calculation unit 64 may determine which spatial resolution layers are available, as well as a downsampling ratio for each of the layers. Then, quality calculation unit 64 may determine which of the layers would be requested based on the user's head movement trajectory.

For example, assuming that a user's previous FoV was equal to the user's current FoV (due to the user's head movement trajectory being zero), the FoV may include only video data from a highest quality layer. If the user's head movement trajectory was relatively small, the FoV may include video data from a highest quality layer and from a second highest quality layer. If the user's head movement trajectory was very large, the FoV may include video data only from a lowest quality layer. Using potential user head movement trajectories, as well as qualities for the various available layers, quality calculation unit 64 may provide quality metrics for best- and worst-case scenarios, as well as scenarios between the best- and worst-cases. An administrator may then use these quality metrics to determine whether the selected qualities (e.g., resolutions) for the various layers provide acceptable quality in the various user head movement trajectory cases, or if any adjustments could or should be made (e.g., adding or removing layers, increasing or decreasing quality for one or more of the layers, or the like).

In another example, video downsampling unit 56 may downsample actual spherical image data to one or more lower resolution layers. For example, video downsampling unit 56 may downsample a 6K input spherical image (or each image of a 6K input spherical video) into 4K, 1080p, and 720p layers. Alternatively, video downsampling unit 56 may downsample only those regions of the spherical image that are included in a user FoV, according to the user's previous FoV and the user's head movement trajectory. In any case, video downsampling unit 56 may provide the downsampled video data to video upsampling unit 62. Video upsampling unit 62 may then upsample the data within the user's FoV, and provide the upsampled video data to quality calculation unit 64. Quality calculation unit 64 may then calculate a quality metric for the user's FoV of the upsampled video data, e.g., using a scaling PSNR formula. For example, quality calculation unit 64 may calculate the quality metric using the spatially weighted PSNR of the user's FoV, which may spatially weight pixels included in the user's FoV, comparing the upsampled video data to the original, raw video data from video source 52. A spatially weighted PSNR formula is discussed in greater detail below with respect to FIG. 9.

In another example, video downsampling unit 56 may provide the original layer and the downsampled layers to video encoding unit 58. Video encoding unit 58 may then encode each of the layers. Alternatively, video encoding unit 58 may only encode regions within the user FoV, where video encoding unit 58 may determine one layer for each region within the user's FoV based on the user's previous FoV and the user's head movement trajectory. Video encoding unit 58 may also provide the encoded video data to video decoding unit 60. Video decoding unit 60 may decode the encoded video data, and pass the decoded video data to video upsampling unit 62. Video upsampling unit 62 may then upsample the decoded video data and pass the upsampled, decoded video data to quality calculation unit 64. Again, quality calculation unit 64 may calculate a quality metric for the user's FoV using, e.g., a scaling PSNR formula, such as the spatially weighted PSNR formula, as discussed above.

In general, quality calculation unit 64, when executing the spatially weighted PSNR formula, may determine weights to apply to pixel values within the user FoV. When determining such weights, quality calculation unit 64 may determine relatively higher weighting values for pixels that are near a center of the user field of view and relatively lower weighting values pixels that are near edges of the user field of view. Quality calculation unit 64 may calculate pixel error values for each pixel within the FoV, e.g., by subtracting the pixel values of the upsampled image data from the corresponding pixel values of the raw image data. Quality calculation unit 64 may then generally apply the weighting values to the pixel error values (or the squares of the pixel error values).

Additionally or alternatively, quality calculation unit 64 may calculate a quality metric for video data using a temporally weighted PSNR formula. A temporally weighted PSNR formula is discussed in greater detail below with respect to FIG. 9. In general, quality calculation unit 64, by executing the temporally weighted PSNR formula, may determine temporal weighting values such that quality calculation unit 64 determines a relatively lower temporal weighting value when the user field of vision is changing quickly, and determine a relatively higher temporal weighting value when the user field of vision is changing slowly or not changing at all.

An administrator may review any or all of these quality metric values to make adjustments to the available layers, such as number and/or quality for the layers, and/or coding decisions for the layers and/or images within the layers (e.g., quantization parameters (QPs) used for the images/layers). Once the quality metrics are within acceptable levels, video encoding unit 58 may store encoded representations for each of the layers as video data 66 (i.e., in a memory of source device 50). Then, output interface 68 may output video data 66 to a client device (e.g., destination device 14 of FIG. 1, not shown in FIG. 2). In particular, output interface 68 may output video data of a particular quality based on an actual user's FoV.

Figure 3B:
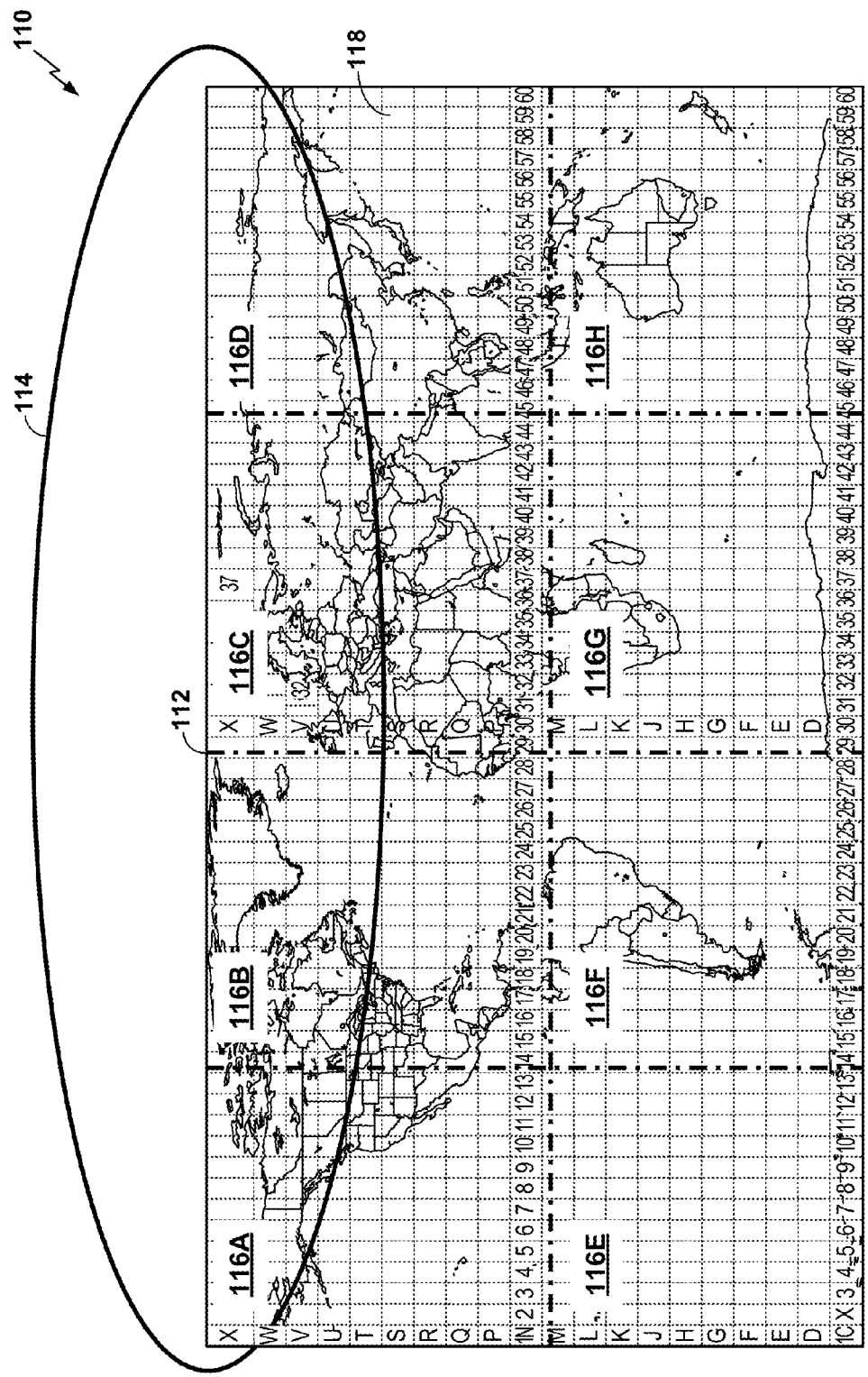

FIGS. 3A and 3B are conceptual diagrams illustrating representations of models for displays used to present panoramic video data. FIG. 3A illustrates an example of a cube map projection 100, while FIG. 3B illustrates equi-rectangular projection 110.

In FIG. 3A, each of 6 faces 102A-102F (faces 102) of cube 104 is divided into four tiles (for a total of 24 tiles).

Tiles of visible faces (i.e., faces 102A, 102B, and 102C) are labeled as tiles 106A-106L. In particular, face 102C is divided into tiles 106A-106D, face 102B is divided into tiles 106E-106H, and face 102A is divided into tiles 106I-106L. The tiles of the hidden faces (i.e., faces 102D, 102E, and 102F) are unlabeled in FIG. 3A for purposes of readability, but it should be understood that faces 102D-102F are also divided into tiles. "Tiles" may also be referred to as regions. Each of cube faces 102 in FIG. 3A corresponds to a 90 degree by 90 degree field of view (FoV). Any arbitrary 90×90 degree tile of the sphere may require decoding of $\frac{1}{3}^{rd}$ of the panorama at high resolution. The FoV rarely spans more than eight tiles. Thus, the span of high resolution decode can be restricted to eight tiles or less, without losing visual quality.

FIG. 3B illustrates canvas 118, which is divided into eight tiles 116A-116H. In this example, when a user is looking at the "poles" of the sphere (e.g., north pole 112, where the user's field of view when looking at north pole 112 is represented by grey shaded area 114), the entire upper half of canvas 118 (i.e., tiles 116A-116D) would need to be decoded at high resolution. Breaking tiles 116A-116D up into more vertical tiles would not help to solve the problem. Thus, in this example, half of the panorama would need to be decoded at high resolution. This is significantly more high resolution data than in the example of FIG. 3A. Therefore, the techniques of this disclosure may use cube map projection model 100 for the display.

Referring to the example discussed with respect to FIG. 1 above, in which video data is coded at resolutions including 6 k, 4 k, HD (1080p), and 720p, in FIG. 3A, front four tiles 106A-106D (also referred to as "regions") may be decoded at 6 k resolution, neighboring eight tiles (e.g., tiles 106E, 106G, 106K, and 106L, as well as the unlabeled tiles of faces 102D and 102F that neighbor tiles 106A, 106C, and 106D) may be decoded at 4 k resolution, neighboring eight tiles to these eight tiles (i.e., tiles 106F, 106H, 106I, 106J, and the other unlabeled tiles that neighbor the tiles that neighbor tiles 106A, 106C, and 106D) may be decoded at HD (1080p) resolution, and the four back tiles may be decoded at 720p resolution. In this example, the total bandwidth requirement for such video data would be 6.5 MP per frame. In a worse-case scenario in which there is an 8-4-4-8 distribution of tiles across the resolutions in decreasing order, there would be 8.17 MP per frame.

Figure 4:
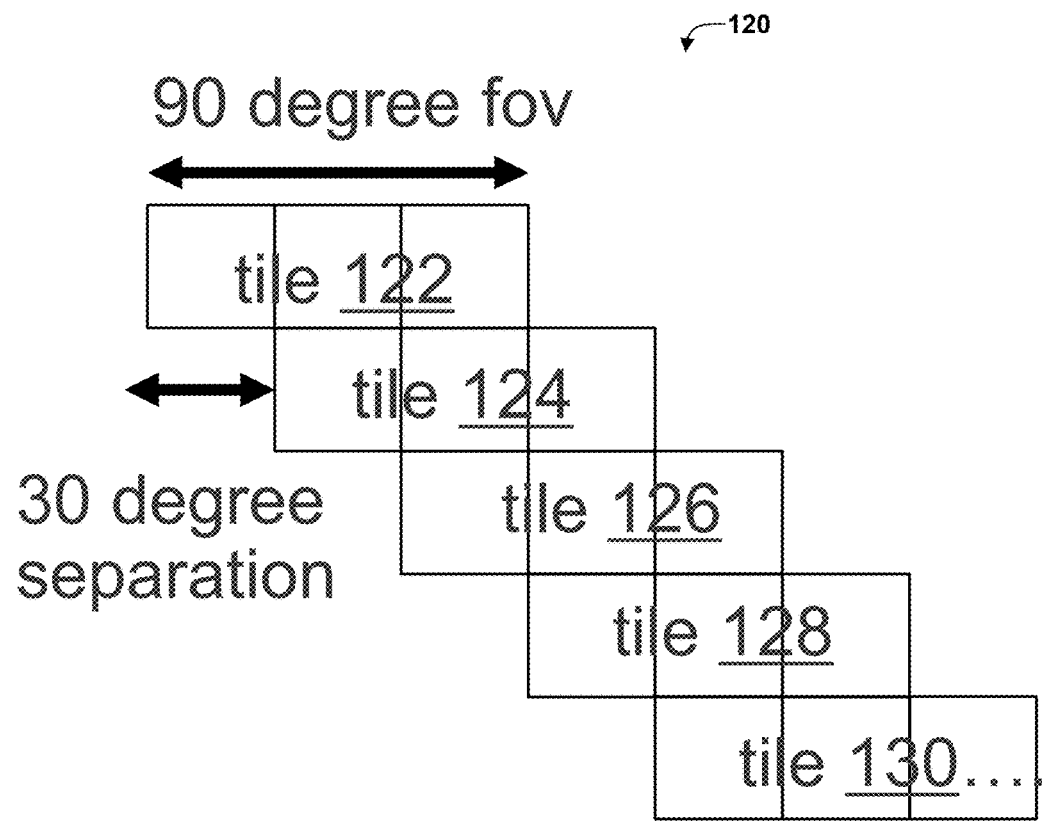
FIG. 4 is a conceptual diagram illustrating an example of cylindrical panorama video data.

FIG. 4 is a conceptual diagram illustrating an example of cylindrical panorama video data 120. Cylindrical panorama video data 120 is partitioned into tiles 122-130. Bit rate reductions may be equally, if not more, important for certain uses than reductions in decoder complexity. For example, some reports indicate that the average U.S. Internet connection speed is 5 mbps, compared to a 30 mbps requirement for conventional, high quality panoramic video data. Carving up multiple small tiles from the panorama may reduce compression efficiency. That is, there may be some loss in temporal prediction efficiency.

In the example of FIG. 4, the server (e.g., source device 12 of FIG. 1 or source device 50 of FIG. 2) may store 12×90 degree tiles 122-130 (which is equivalent to three copies of the panorama). This example may be used to avoid small tiles, which means that compression efficiency is not compromised. In addition, 12×30 degree tiles may also be stored. An arbitrary 90 degree view would then require at the most four 30 degree tiles, where one 30 degree tile and one 90 degree tile can be used to compose an arbitrary 90 degree view.

A bitrate optimization for spherical panorama video data 120 may be achieved using the techniques of this disclosure. The idea of trading off storage space to save bitrate can be generalized to other cases. For instance, it is not necessary that same tile granularity is available at all the viewing angles. Unlike the cylindrical panorama case, covering all the viewpoints with equal tile granularity is not trivial for spherical panoramas.

In general, video encoder 20 of FIG. 1 (or video encoding unit 58 of FIG. 2) may save copies of spherical panorama video data 120 at multiple tile granularities. Bigger tiles than tiles 122-130 (not shown) can have overlapping fields of views between them in some places for better coverage. For example, video encoder 20 may encode the most interesting viewpoints (as determined by a user, such as an administrator, who is preparing the content) at larger tile sizes. In this manner, source device 12 may send a combination of multiple sized tiles, e.g., a large tile (e.g., four times the tile size of one of tiles 122-130) for a region at which a visual focus of a user is directed, and smaller tiles for the other remaining regions (for a total of 21 tiles, with respect to the example of FIG. 3A).

An example tile coding in the cuboidal projection may be as follows: cube faces may be A, B, C, and D, forming the horizontal ring, E for the top, and F for the bottom. The smallest tiles may be A1, A2, A3, A4, B1, B2, . . . , F1, F2, F3, and F4 (for a total of 24 tiles). The larger tiles may be A, B, C, D, E, and F (where tile A covers the area spanned by tiles A1, A2, A3, and A4, B covers the area spanned by tiles B1, B2, B3, and B4, and so on for each of tiles C-F). In some examples, only those viewpoints which are more likely to be viewed would be coded at larger tile sizes. Thus, if it is unlikely that a user would look up or down, only A, B, C, and D could be coded as large tiles. Optionally, each of these tiles may have left and right views for stereo video data.

Video encoder 20 may prepare the video data for a stereo video case to improve latency when destination device 14 switches from a low resolution stream to a high resolution stream. The techniques of this disclosure may avoid introduction of additional motion to photon (m2p) latency. In general, latency during the transition from, e.g., low resolution to high resolution (when the user moves his/her head) can be large. The maximum latency is equal to the latency from a heads up display (HUD) to server and back (e.g., the roundtrip latency between destination device 14 and server device 12) plus the length of a GOP structure or time until next I-frame is decoded. However, the scenario where content at different resolutions is available at the HUD (either stored locally in a file or streamed) causes the network delay portion to be 0 in the maximum latency calculation above.

Although generally discussed with respect to source device 12 of FIG. 1, it should be understood that source device 50 of FIG. 2 may perform substantially similar techniques as discussed with respect to FIG. 4.

Figure 5:
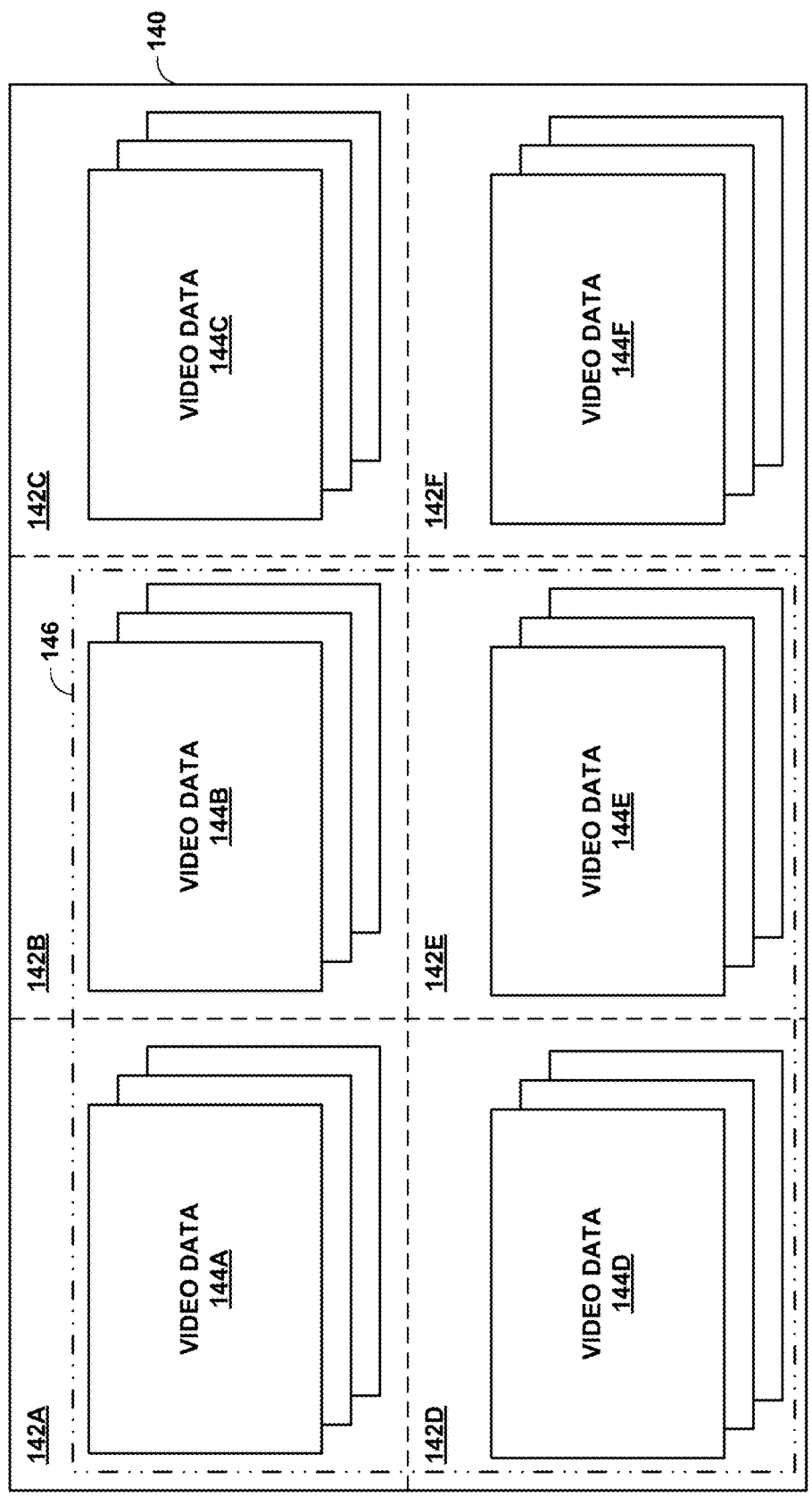
FIG. 5 is a conceptual diagram illustrating an example canvas divided into regions.

FIG. 5 is a conceptual diagram illustrating an example canvas 140 divided into regions 142A-142F (regions 142). For purposes of discussion, canvas 140 is divided as a rectangle into rectangular regions 142, although it should be understood that this discussion may apply to a cube map projection similar to cube map projection 100 as shown in FIG. 3A.

In accordance with the techniques of this disclosure, various sets of video data may be provided for each of regions 142. In the example of FIG. 5, video data 144A is provided for region 142A, video data 144B is provided for region 142B, video data 144C is provided for region 142C, video data 144D is provided for region 142D, video data 144E is provided for region 142E, and video data 144F is provided for region 142F. Each of video data 144A-144F may include video data encoded at a variety of quality levels, e.g., spatial resolutions. For example, each of video data 144A-144F may include video data encoded at proportional 6K resolution (that is, having pixel density of 6K resolution), 4K resolution, 1080P resolution, and 720P resolution.

In some examples, video data may be provided that covers a plurality of regions 142. In the example of FIG. 5, video data 146 is provided that covers regions 142A, 142B, 142D, and 142E. Thus, if a user's focus is directed at a field of view including regions 142A, 142B, 142D, and 142E, destination device 14 may simply retrieve video data 146, rather than retrieving individual sets of video data from video data 144A, 144B, 144D, 144E. In some examples (such as that shown in FIG. 5), only a single quality (e.g., spatial resolution) is provided that covers multiple regions, although in other examples, multiple qualities may be provided for multiple regions.

FIG. 6 is a conceptual diagram illustrating a correspondence between an example canvas 180 and corresponding cube map views 182A, 182B. In particular, canvas 180 includes a plurality of tiles that are differently shaded, where different shading represents different quality levels (e.g., spatial resolutions) that are requested. Cube map views 182A, 182B represent where each of the tiles of canvas 180 would be displayed. Cube map view 182A shows a front perspective view of front views of the cube map, while cube map view 182B shows a cut-away front perspective of rear tiles of the cube map. White tiles represent a highest quality level (e.g., highest spatial resolution), diagonally shaded tiles represent a second highest quality level, cross-hatch shaded tiles represent a third highest quality level, and solid black shaded tiles represent a lowest quality level. The quality levels may also be referred to as "layers."

In one example, to achieve lower quality levels, spatial resolution is downsampled. For example, layer 1 may be full spatial resolution, layer 2 may be spatially reduced by one-half in the horizontal and vertical directions (for a total of one-quarter spatial resolution), layer 3 may be spatially reduced by one-third in the horizontal and vertical directions (for a total of one-ninth spatial resolution), and layer 4 may be spatially reduced by one-fourth in the horizontal and vertical directions (for a total of one-sixteenth spatial resolution).

As noted above, one example technique of this disclosure is FoV pixel coverage. That is, source device 50 of FIG. 2, for example, may calculate a quality metric representing an FoV pixel coverage. In general, FoV pixel coverage is a calculation of a total number of pixels included in an FoV, based on which layers are included in the FoV. For example, an FoV may cover a particular portion of canvas 180, and thus, the FoV may overlap tiles forming part of any of the quality levels. Weighting based on the amount of downsampling may be applied to the various tiles covered by the FoV. Table 1 below describes the weighting applied to each quality level/layer, based on the amount of downsampling used to produce the corresponding quality level:

TABLE 1

| | Layer | | | |
|---|---|---|---|---|
| | 1 | 2 | 3 | 4 |
| Downsampling | N/A | 2x | 3x | 4x |
| Weight | 1 | ¼ | ⅑ | ¹⁄₁₆ |

Thus, to calculate the FoV pixel coverage, quality calculation unit 64 of source device 50 of FIG. 2 may calculate the following formula:

$$FoV\ \text{Pixel Coverage} = A1 + \frac{1}{4}A2 + \frac{1}{9}A3 + \frac{1}{16}A4,$$

where A1 represents the area of layer 1 tiles within the FoV, A2 represents the area of layer 2 tiles within the FoV, A3 represents the area of layer 3 tiles within the FoV, and A4 represents the area of layer 4 tiles within the FoV.

Accordingly, the FoV pixel coverage calculation yields a number between the smallest weight (e.g., ¹⁄₁₆ in this example) and 1 that describes the actual number of pixels used to reconstruct the FoV normalized by the full number of FoV pixels.

In this manner, the techniques for calculating the FoV pixel coverage value represent an example of a method of calculating a quality metric for video data, including determining a user field of view for a spherical image of the video data, determining weighting values for pixels of the spherical image based on the user field of view, and calculating a quality metric for the user field of view of the spherical image using the weighting values, wherein calculating the quality metric comprises applying the weighting values to values for the pixels.

Figure 7:
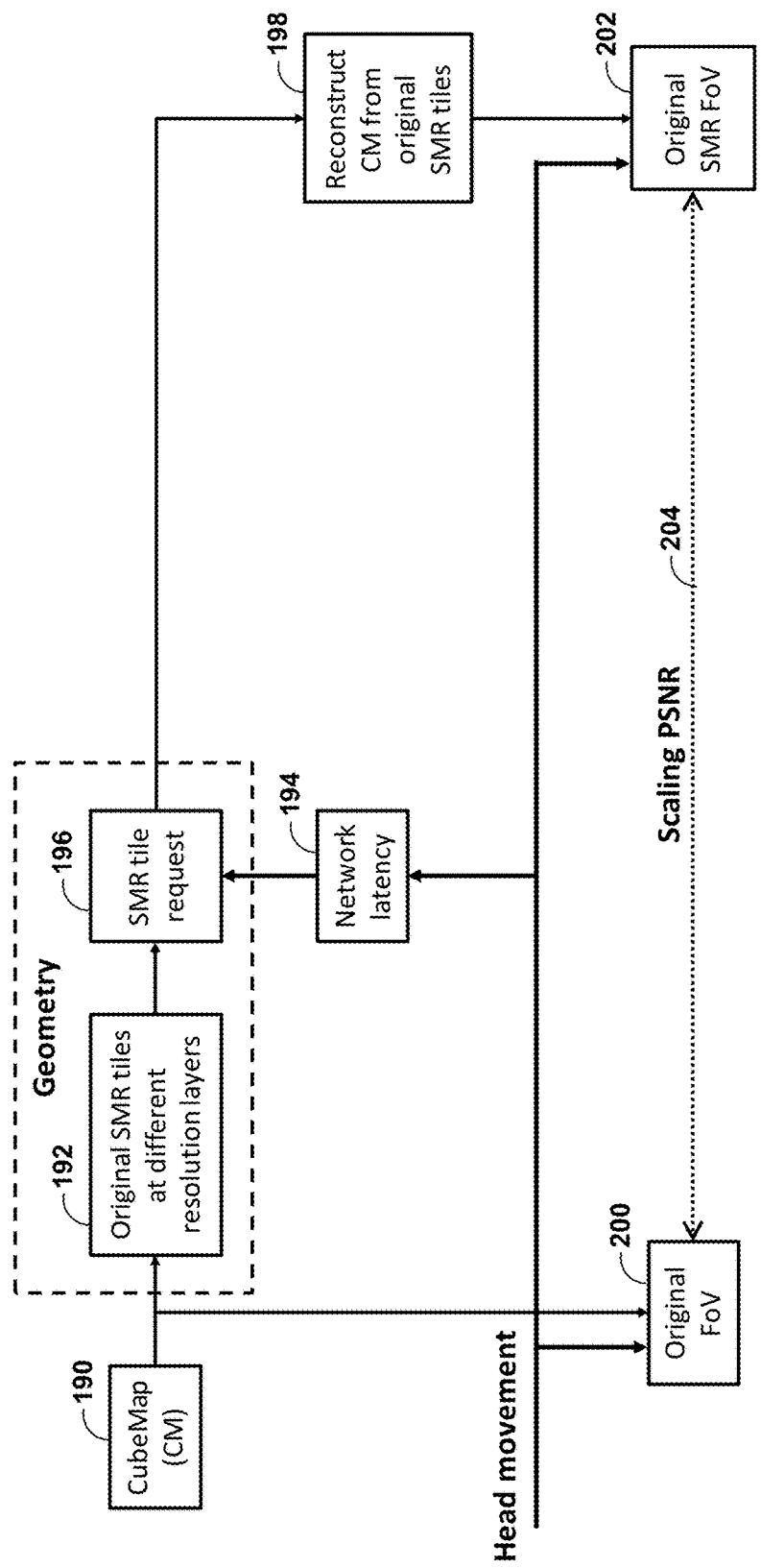
FIG. 7 is a flow diagram illustrating example techniques in accordance with this disclosure for calculating a scaling PSNR quality metric.

FIG. 7 is a flow diagram illustrating example techniques in accordance with this disclosure for calculating a scaling PSNR quality metric. Source device 12 of FIG. 1, source device 50 of FIG. 2, or one or more units thereof, may be configured to perform this technique. For purposes of explanation, the techniques of FIG. 7 are explained with respect to source device 50 of FIG. 2.

In the example of FIG. 7, quality calculation unit 64 compares original FoV data 200 to a reproduction of the original FoV data, i.e., downsampled and subsequently upsampled simultaneous multi-resolution (SMR) FoV data (labeled "original SMR FoV data 202" in FIG. 7) to calculate a scaling PSNR value (that is, the quality metric, in this example). In particular, cube map data 190 represents raw video data to be displayed on a cube map projection (for example). FoV determination unit 52 determines original FoV data 200 from observations by various users. Source device 50 transforms cube map data 200 into tiles at various resolution layers (i.e., original SMR tiles at different spatial resolution layers) (192). Video downsampling unit 56 downsamples original FoV data 200, and then video upsampling unit 62 upsamples the downsampled FoV data to produce original SMR FoV data 202.

FoV determination unit 54 simulates network latency 194 accounted for in generating example SMR tile requests (196) based on the test users' head movement data. Ultimately, quality calculation unit 64 may calculate the scaling PSNR 204 by comparing original FoV data 200 to SMR FoV data 202. In one example, quality calculation unit 64 calculates the scaling PSNR value using the spatially weighted PSNR formula discussed below with respect to FIG. 10. In general, to calculate the scaling PSNR value, quality calculation unit 64 may apply weights (which may be determined based on proximity of pixels to a center of the FoV or to an edge of the FoV) to pixel error values for the pixels.

In this manner, the techniques of FIG. 7 represent an example of a method of calculating a quality metric for video data, including determining a user field of view for a spherical image of the video data, determining weighting values for pixels of the spherical image based on the user field of view, and calculating a quality metric for the user field of view of the spherical image using the weighting values, wherein calculating the quality metric comprises applying the weighting values to values for the pixels.

Figure 8:
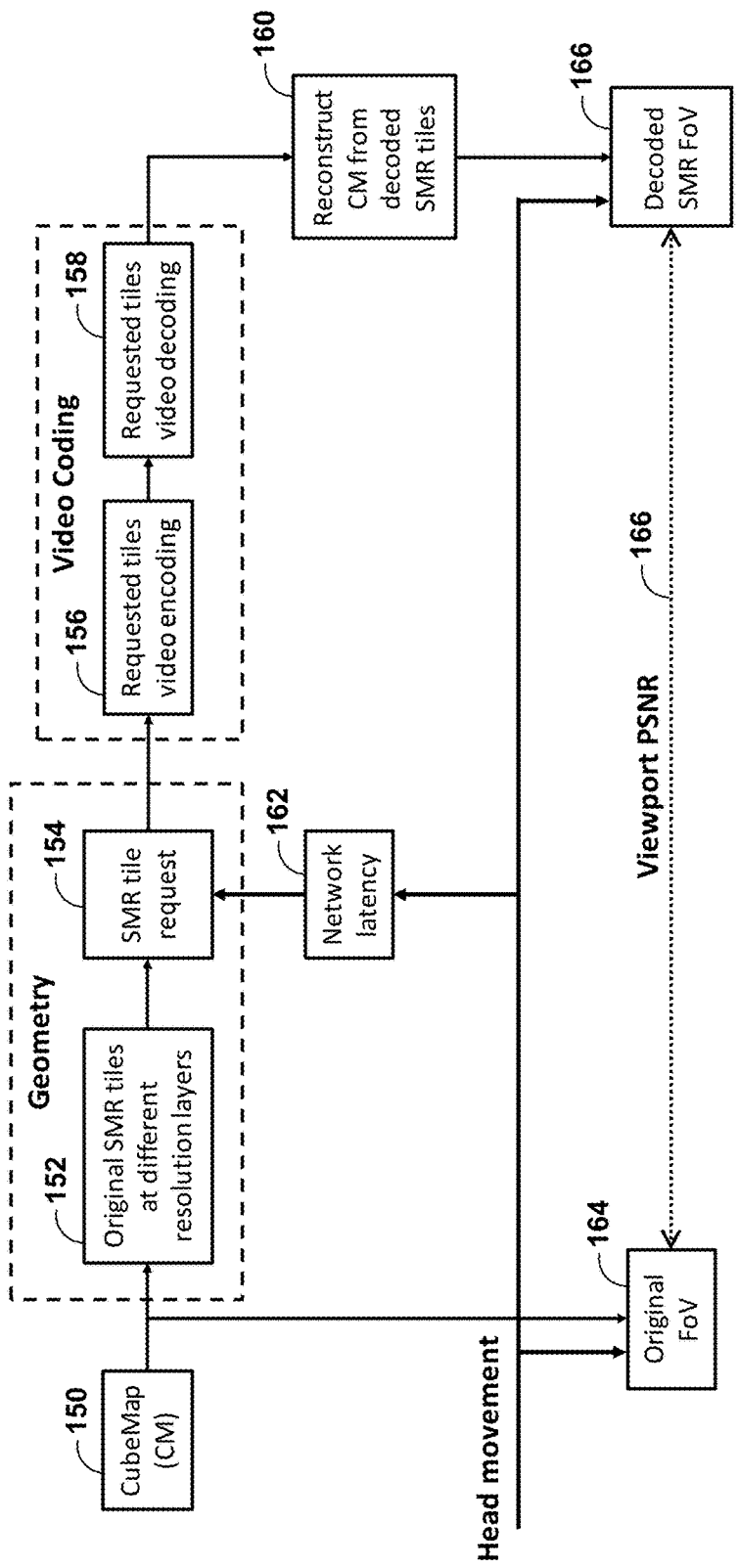
FIG. 8 is a flow diagram illustrating example techniques in accordance with this disclosure for calculating quality metrics for an example set of encoded media data.

FIG. 8 is a flow diagram illustrating example techniques in accordance with this disclosure for calculating quality metrics for an example set of encoded media data. Source device 12 of FIG. 1, source device 50 of FIG. 2, or one or more units thereof, may be configured to perform these techniques. For purposes of explanation, the techniques of FIG. 8 are explained with respect to source device 50 of FIG. 2.

Quality calculation unit 64 may calculate and use the quality metrics to determine a manner in which video encoding unit 58 encodes the media data. For example, video encoding unit 58 may use the quality metrics to determine encoding schemes (such as which qualities of video data to offer for different canvas regions, tile sizes to offer for various canvas regions, and the like) and/or projections for the video data, or other such decisions.

In general, video encoding unit 58 may compare quality metrics for multiple different encoding schemes and/or projections based on heuristic testing by a number of users (e.g., ten users). That is, media data may be presented to the users, and data such as where the users look at the screen, speed and timing of head movements throughout the presentation of the media data, and the like, may be collected. This data may be used to determine when different tiles of the canvas would be requested at particular quality levels (e.g., relatively high quality for regions in or near the users' focal area, relatively low quality levels for regions outside of the users' focal area).

In the example of FIG. 8, quality calculation unit 64 may calculate quality metrics based on comparisons of video data in the viewport domain. That is, quality calculation unit 64 may compare raw, uncoded video data to decoded video data to determine a quality metric, such as a peak signal to noise ratio (PSNR) in regions where the test users tend to look. For example, the PSNR calculation may include application of weight values to residual values (or error values) for pixels in a field of view (FoV) representing an area where users tend to look based on heuristic testing. Furthermore, pixel error values at and nearer the center of the FoV may be more heavily weighted when calculating the quality metric (e.g., the PSNR) than pixel error values at or near edges of the FoV. An example PSNR including such weightings is discussed in greater detail with respect to FIG. 9 below.

In the example of FIG. 8, quality calculation unit 64 compares original FoV data 164 to decoded SMR FoV data 166 to calculate the viewport PSNR (that is, the quality metric). In particular, cube map data 150 represents raw, uncoded video data to be displayed on a cube map projection (for example), which various users may observe in order to generate test data representing original FoV data 164. FoV determination unit 54 determines the FoV based on these users' observations of presentations of the video data. Video downsampling unit 56 downsamples tiles of cube map data 150 at various resolution layers (152). In addition, source device 50 simulates and accounts for network latency 162 in generating example SMR tile requests (154) based on the test users' head movement data.

Video encoding unit 58 then encodes each of the requested tiles using, e.g., HEVC (156). Video decoding unit 69 then decodes the encoded tiles, using the corresponding video coding standard, e.g., HEVC (158). Video upsampling unit 62 may then upsample the decoded video data and ultimately reconstruct the cube map from the decoded SMR tiles (160) to generate decoded SMR FoV data 166. Ultimately, quality calculation unit 64 may calculate the viewport PSNR by comparing the original FoV data 164 to the decoded SMR FoV data 166, e.g., according to the techniques of FIG. 9 as discussed below. Again, this may include calculating weights based on proximity of pixels within the FoV to a center of the FoV or an edge of the FoV, and applying the weights to pixel error values for the pixels.

In this manner, the techniques of FIG. 8 represent an example of a method of calculating a quality metric for video data, including determining a user field of view for a spherical image of the video data, determining weighting values for pixels of the spherical image based on the user field of view, and calculating a quality metric for the user field of view of the spherical image using the weighting values, wherein calculating the quality metric comprises applying the weighting values to values for the pixels.

FIG. 9 is a conceptual diagram illustrating an example technique for calculating a quality metric in accordance with the techniques of this disclosure. In particular, FIG. 9 illustrates graph 170 showing weightings assigned based on field of view (FoV) width (W) and FoV height (H). In graph 170, the bottom axes show height H and width W of the FoV on which users tend to focus at a time t, and the vertical axis depicts error weights to be assigned according to a PSNR formula used to calculate a spatially weighted PSNR at time t, representing a quality metric for time t. As can be seen, higher weights are assigned to regions of the FoV that are closer to the center of the FoV, while lower weights are assigned to regions that are closer to the edges of the FoV. As shown in FIG. 9, the weights to be applied may range from 0 to 1, e.g., in increments of 0.2.

In accordance with the quality selection techniques discussed above, quality calculation unit 64 of FIG. 2 may be configured to assign weights to pixel error values of pixels of the FoV based on positions of the pixels within the user's FoV. For example, weights of 0 may be assigned to pixel error values near edges of the FoV, whereas weights of 1 may be assigned to pixel error values near the center of the FoV, with weights between 0 and 1 assigned to other pixel error values based on the pixels' proximity to the center of the FoV.

The following formula represents an example formula for calculating PSNR at time t according to the techniques of this disclosure (and is also shown in FIG. 9). In the formula below, t represents a time at which video data is displayed for a full canvas for both a user's FoV of an original image from video sequence I1 and the user's FoV of a decoded image from decoded video sequence I2, W and H represent the width and the height of the FoV, respectively, x and y represent x and y coordinates of a sample (pixel) within the FoV, (x, y, t) represents the value of the pixel at position (x, y) in the FoV of the original image at time t from video sequence I1, I2(x, y, t) represents the value of the pixel at position (x, y) in the FoV of the decoded image at time t from decoded video sequence I2, and ErrorWeight(x,y)

represents an error weight value to be applied based on the position of (x, y) in the canvas relative to the users' field of view.

Spatially Weighted $PSNR(t) =$ $$10\log_{10}\left(\frac{1}{\frac{1}{WH}\sum_{x=1}^{W}\sum_{y=1}^{H}[ErrorWeight(x, y) * (I1(x, y, t) - I2(x, y, t))]^2}\right)$$

FoV determination unit 54 may collect the users' FoV data during one or more heuristic tests during which users view playback of video data. The users may be equipped with head tracking hardware to monitor the directions in which they look while the video data is presented. Although eye tracking could be used, eye tracking is not necessary, as it can be assumed that the users direct their eyes to the center of the FoV in which they are looking.

Furthermore, quality calculation unit 64 may calculate the quality metric using temporal weighting. That is, quality calculation unit 64 may calculate the quality metric based on weighting values that account for user head movement over time, as determined during the heuristic tests with multiple users. For example, if a user's field of view is changing quickly, weights applied during the PSNR calculation (or other such formula) may be lower, whereas if the user's field of view is changing slowly or is not changing at all, weights applied during the PSNR calculation (or other such formula) may be higher.

Figure 10:
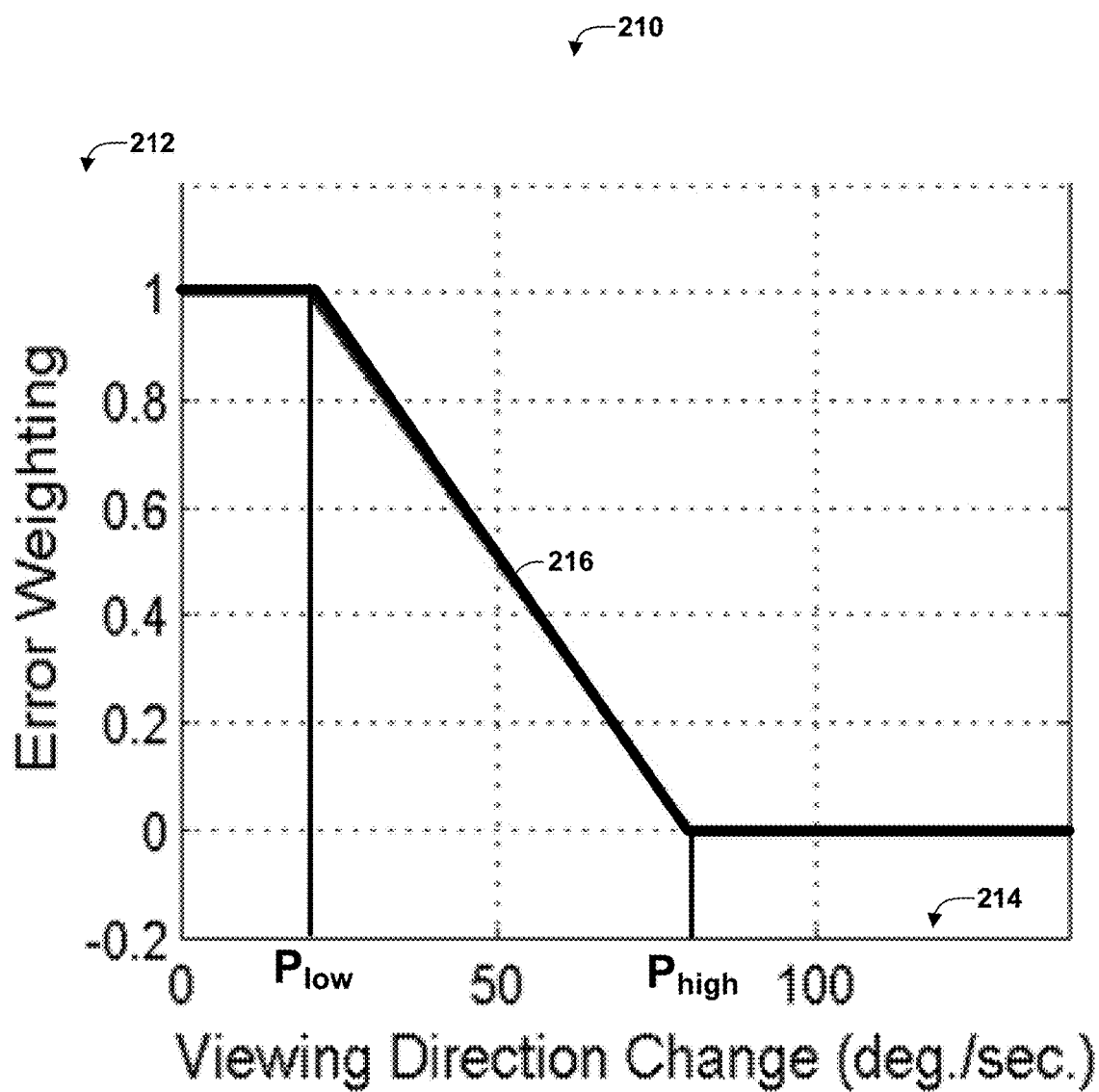
FIG. 10 is a graph illustrating example error weights applied to different pixel error values based on a viewing direction change (measured in degrees per second).

FIG. 10 is a graph illustrating example error weights applied to different pixel error values based on a viewing direction change (measured in degrees per second). Quality calculation unit 64 of FIG. 2 may apply these weights when calculating a quality metric (such as a viewport PSNR or scaling PSNR) in the form of temporal weighting. Quality calculation unit 64 may apply temporal weighting independently, or in combination with spatial weighting as discussed above with respect to FIG. 9.

In particular, to use temporal weighting when calculating a quality metric, quality calculation unit 64 may, for each video frame, determine the user viewing direction as a vector connecting the center of a unit sphere to the center of the viewport (that is, the FoV). Quality calculation unit 64 may then measure the angle between the viewing directions for two consecutive frames. Quality calculation unit 64 may then divide the angle by the frame time given by (1/fps) →Rate of change in viewing direction in degrees per second. For each video frame, quality calculation unit 64 may calculate the rate of change in viewing direction and map this rate of change to an error weight using a mapping curve, such as that shown in FIG. 10. Quality calculation unit 64 may then multiply the error weight by the error (e.g., residual) used in the calculation of quality metrics.

In some examples, the temporal weighting is applied in the spatial domain (i.e., the pixel domain). In other examples, quality calculation unit 64 may apply the temporal weighting in the frequency domain. For example, quality calculation unit 64 may calculate residuals by determining pixel-by-pixel differences between an original image and a modified image (whether spatially downsampled and upsampled, encoded and decoded, or both), then transform the residuals using, e.g., a discrete cosine transform, discrete sine transform, one or more Karhunen-Loève transforms, or the like, to produce one or more sets of residuals in the frequency domain. Errors at high frequency content may be given less weight (that is, less importance) during fast head movement than errors in low frequency content.

The formula below represents an example formula for calculating temporally weighted PSNR for an image at time t:

Temporally Weighted $PSNR(t) =$ $$10\log_{10}\left(\frac{1}{\frac{1}{WH}\sum_{x=1}^{W}\sum_{y=1}^{H}[ErrorWeight(t) * (I1(x, y, t) - I2(x, y, t))]^2}\right)$$

For purposes of example and explanation, the quality metric calculation techniques of this disclosure have been described with respect to techniques for selecting tiles of various quality levels (e.g., spatial resolutions) for different regions of a canvas. However, it should be understood that the quality metric calculation techniques are not limited to use with techniques for selecting tiles as discussed above. The quality metric calculation techniques of this disclosure may be used in any scenario in which quality metric calculation is beneficial. For example, these techniques may be used for general video coding decisions. As another example, these techniques may be used for different projections, e.g., pyramid projection or offset cube geometry. As yet a further example, these techniques may be used in addition or in the alternative to rate-distortion calculation techniques.

Figure 11:
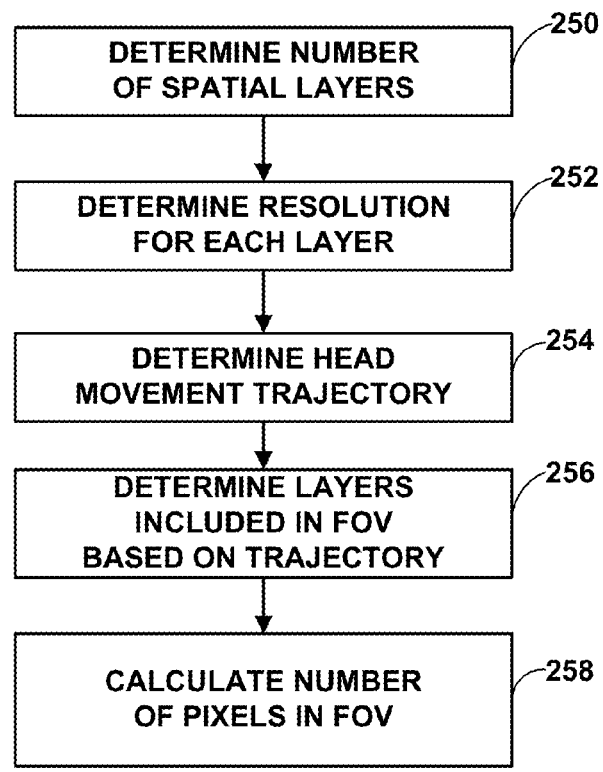
FIG. 11 is a flowchart illustrating an example method for calculating a quality metric for a user field of view of a spherical image using weighting values in accordance with the techniques of this disclosure.

FIG. 11 is a flowchart illustrating an example method for calculating a quality metric for a user field of view of a spherical image using weighting values in accordance with the techniques of this disclosure. The techniques of FIG. 11 are explained with respect to source device 50 of FIG. 2, although it should be understood that other devices may be configured to perform these or similar techniques.

Initially, FoV determination unit 54 may determine a number of spatial layers for video data (250). FoV determination unit 54 may then determine spatial resolutions for each of the layers (252). FoV determination unit 54 may then determine a user head movement trajectory (254).

Quality calculation unit 64 may then determine layers included in the FoV based on the user's head movement trajectory (256). Quality calculation unit may then calculate a number of pixels included in the FoV (258) from the pixels of each layer included in the FoV. For example, quality calculation unit 64 may perform the FoV pixel coverage techniques discussed above with respect to FIG. 6 and Table 1 to calculate the number of pixels included in the FoV, where the FoV pixel coverage value represents a quality metric, in this example.

In this manner, the method of FIG. 11 represents an example of a method of calculating a quality metric for video data, including determining a user field of view for a spherical image of the video data, determining weighting values for pixels of the spherical image based on the user field of view, and calculating a quality metric for the user field of view of the spherical image using the weighting values, wherein calculating the quality metric comprises applying the weighting values to values for the pixels.

Figure 12:
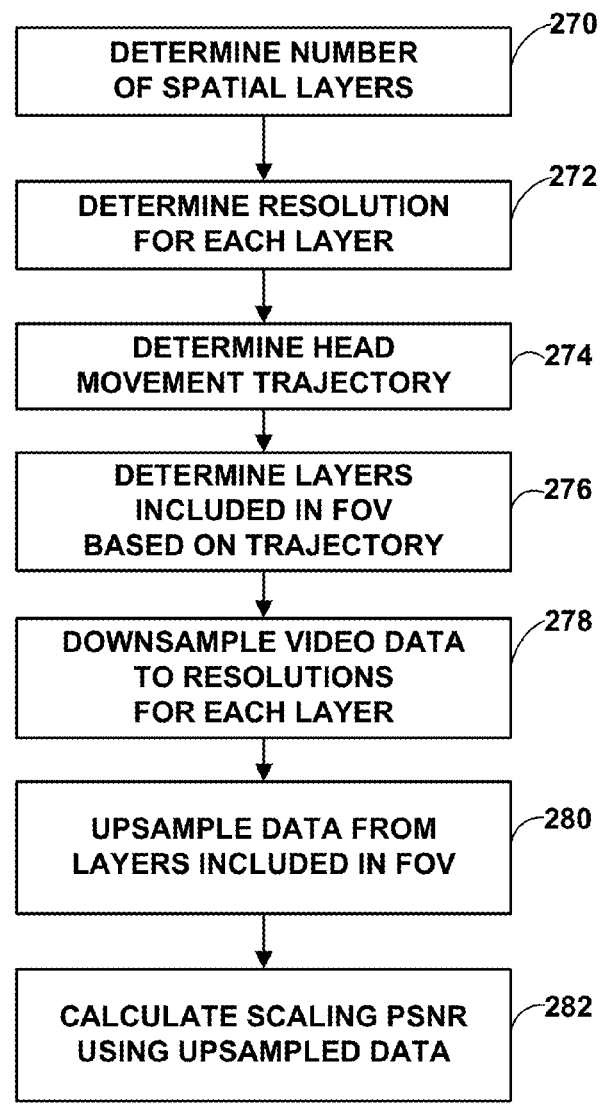
FIG. 12 is a flowchart illustrating another example method for calculating a quality metric for a user field of view of a spherical image using weighting values in accordance with the techniques of this disclosure.

FIG. 12 is a flowchart illustrating another example method for calculating a quality metric for a user field of view of a spherical image using weighting values in accordance with the techniques of this disclosure. The techniques of FIG. 12 are explained with respect to source device 50 of FIG. 2, although it should be understood that other devices may be configured to perform these or similar techniques.

Initially, FoV determination unit 54 may determine a number of spatial layers for video data (270). FoV determination unit 54 may then determine spatial resolutions for each of the layers (272). FoV determination unit 54 may then determine a user head movement trajectory (274). FoV determination unit 54 may also determine which of the layers would be included in the FoV based on the user head movement trajectory (276).

Video downsampling unit 56 may then downsample the video data to corresponding resolutions for the layers included in the FoV (278). Video downsampling unit 56 may downsample all of the available layers, or only portions of the layers included in the FoV. Subsequently, video upsampling unit 58 may upsample the data from the layers included in the FoV (280). Then, quality calculation unit 64 may calculate a scaling PSNR value using the upsampled data (282). For example, quality calculation unit 64 may execute the spatially weighted PSNR formula discussed above, using original, raw spherical image data and the upsampled data.

In this manner, the method of FIG. 12 represents an example of a method of calculating a quality metric for video data, including determining a user field of view for a spherical image of the video data, determining weighting values for pixels of the spherical image based on the user field of view, and calculating a quality metric for the user field of view of the spherical image using the weighting values, wherein calculating the quality metric comprises applying the weighting values to values for the pixels. Further, the example method of FIG. 12 includes downsampling image data for one or more of the regions based on proximity of the corresponding regions to the field of view, and upsampling the spherical image data, wherein calculating the quality metric comprises calculating the quality metric using the upsampled image data.

Figure 13:
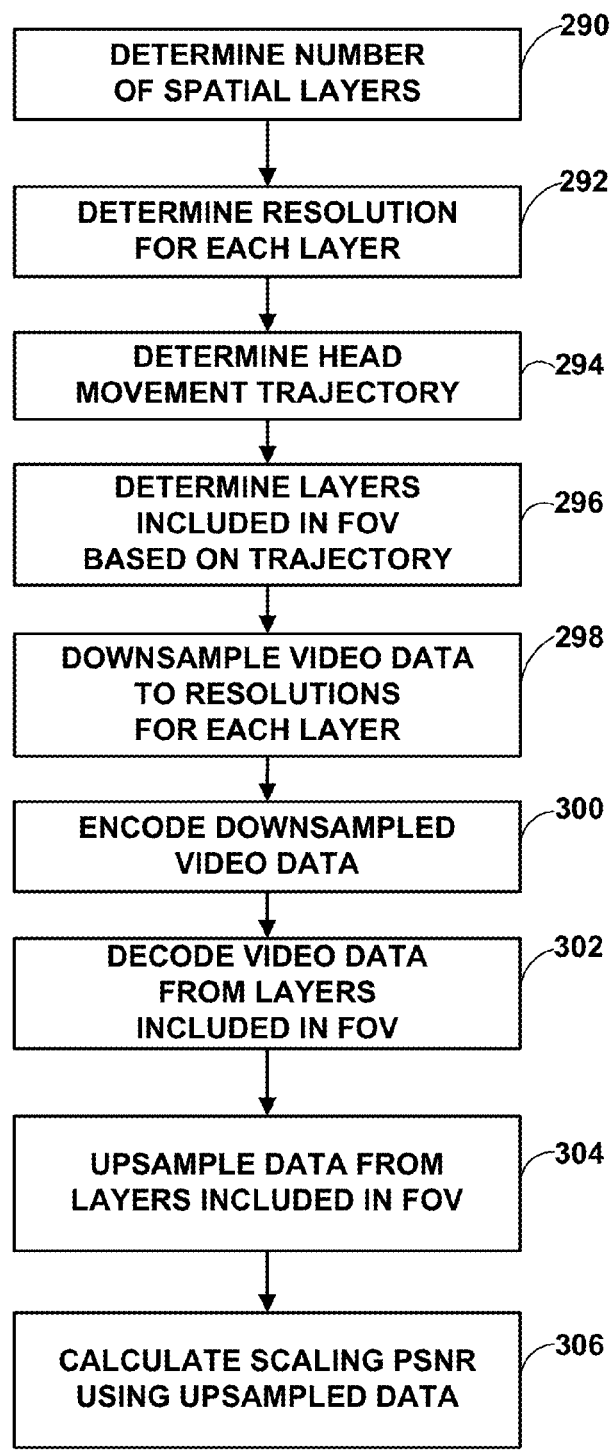
FIG. 13 is a flowchart illustrating another example method for calculating a quality metric for a user field of view of a spherical image using weighting values in accordance with the techniques of this disclosure.

FIG. 13 is a flowchart illustrating another example method for calculating a quality metric for a user field of view of a spherical image using weighting values in accordance with the techniques of this disclosure. The techniques of FIG. 11 are explained with respect to source device 50 of FIG. 2, although it should be understood that other devices may be configured to perform these or similar techniques.

Initially, FoV determination unit 54 may determine a number of spatial layers for video data (290). FoV determination unit 54 may then determine spatial resolutions for each of the layers (292). FoV determination unit 54 may then determine a user head movement trajectory (294). FoV determination unit 54 may also determine which of the layers would be included in the FoV based on the user head movement trajectory (296).

Video downsampling unit 56 may then downsample the video data to corresponding resolutions for the layers included in the FoV (298). Video downsampling unit 56 may downsample all of the available layers, or only portions of the layers included in the FoV. Video encoding unit 58 may then encode the downsampled video data (300).

Subsequently, video decoding unit 60 may decode the encoded video data (302) Video upsampling unit 58 may then upsample the decoded data from the layers included in the FoV (304). Quality calculation unit 64 may then calculate a scaling PSNR value using the decoded, upsampled data (306). For example, quality calculation unit 64 may execute the spatially weighted PSNR formula discussed above, using original, raw spherical image data and the upsampled data.

In this manner, the method of FIG. 13 represents an example of a method of calculating a quality metric for video data, including determining a user field of view for a spherical image of the video data, determining weighting values for pixels of the spherical image based on the user field of view, and calculating a quality metric for the user field of view of the spherical image using the weighting values, wherein calculating the quality metric comprises applying the weighting values to values for the pixels. Further, the example method of FIG. 13 includes encoding image data for each of the regions to form encoded image data, and decoding the encoded image data.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of calculating a quality metric for video data, the method comprising:
    determining a user field of view for a spherical image of the video data;
    determining weighting values for pixels of the spherical image based on the user field of view, wherein determining the weighting values further comprises determining temporal weighting values, wherein determining the temporal weighting values comprises determining a relatively lower temporal weighting value when the user field of vision is changing quickly, and determining a relatively higher temporal weighting value when the user field of vision is changing slowly or not changing; and
    calculating a quality metric for the user field of view of the spherical image using the weighting values, wherein calculating the quality metric comprises applying the weighting values to values for the pixels.

2. The method of claim 1, wherein calculating the quality metric comprises calculating a peak signal to noise ratio (PSNR) value for the spherical image based on an original version of the spherical image and a reproduced version of the spherical image.

3. The method of claim 1, wherein determining the weighting values comprises determining relatively higher weighting values for pixel error values for pixels of the spherical image that are near a center of the user field of view and relatively lower weighting values for pixel error values for pixels of the spherical image that are near edges of the user field of view.

4. The method of claim 1, further comprising forming a plurality of sets of sub-images for corresponding regions of the spherical image, each of the sets of sub-images including sub-images at a plurality of different quality levels, wherein the plurality of different quality levels includes one or more of a plurality of different spatial resolutions for the sub-images or a plurality of different quantization parameters (QPs) used to encode the sub-images.

5. The method of claim 1, wherein the spherical image is partitioned into regions, the method further comprising:
    encoding image data for each of the regions to form encoded image data; and
    decoding the encoded image data,
    wherein calculating the quality metric comprises calculating the quality metric based on the decoded image data.

6. The method of claim 5, wherein encoding the image data comprises:
    determining requested quality levels for each of the regions; and
    encoding the image data for each of the regions such that the image data for each of the regions has the corresponding requested quality level using at least one of spatial resolution for the region or quantization parameter (QP) for the region.

7. The method of claim 5, wherein the spherical image comprises an original cube map projection, the method further comprising constructing a reconstructed cube map projection image using the decoded image data,
    wherein calculating the quality metric comprises calculating the quality metric based on the reconstructed cube map projection.

8. The method of claim 1, wherein calculating the quality metric comprises calculating the quality metric according to:

$$10\log_{10}\left(\frac{1}{\frac{1}{WH}\sum_{x=1}^{W}\sum_{y=1}^{H}[ErrorWeight(x, y)*(I1(x, y, t) - I2(x, y, t))]^2}\right),$$

wherein W represents a width of the field of view in pixels, H represents a height of the field of view in pixels, x represents an x coordinate of a pixel in the field of view, y represents a y coordinate of a pixel in the field of view, ErrorWeight(x, y) returns a weight value for a pixel at position (x, y) in the field of view, I1(x, y, t) represents a pixel at position (x, y) of the field of view in an original version of the spherical image occurring at time t in the video data, and I2(x, y, t) represents a pixel at position (x, y) of the field of view in a reproduced version of the spherical image occurring at time t in the video data.

9. The method of claim 1, wherein the spherical image is partitioned into regions, the method further comprising:
    downsampling image data for one or more of the regions based on proximity of the corresponding regions to the field of view; and
    upsampling the downsampled image data, wherein calculating the quality metric comprises calculating the quality metric using the upsampled image data,
    wherein determining the weighting values comprises determining the weighting values such that the weighting values correspond to the amount of downsampling applied in the corresponding region.

10. The method of claim 1, wherein calculating the quality metric comprises calculating the quality metric according to:

$$10\log_{10}\left(\frac{1}{\frac{1}{WH}\sum_{x=1}^{W}\sum_{y=1}^{H}[ErrorWeight(t)*(I1(x, y, t) - I2(x, y, t))]^2}\right),$$

wherein W represents a width of the field of view in pixels, H represents a height of the field of view in pixels, x represents an x coordinate of a pixel in the field of view, y represents a y coordinate of a pixel in the field of view, ErrorWeight(t) returns a temporal weight value determined based on a speed of head movement for the spherical image occurring at time t relative to a previously displayed image, I1(x, y, t) represents a pixel at position (x, y) of the field of view in an original version of the spherical image occurring at time t in the video data, and I2(x, y, t) represents a pixel at position (x, y) of the field of view in a reproduced version of the spherical image occurring at time t in the video data.

11. A device for calculating a quality metric for video data, the device comprising
a memory configured to store a spherical image of the video data; and
one or more processors implemented using discrete logic circuitry and configured to:
determine a user field of view for the spherical image;
determine weighting values for pixels of the spherical image based on the user field of view, wherein to determine the weighting values, the one or more processors are configured to determine temporal weighting values, and wherein to determine the temporal weighting values, the one or more processors are configured to determine a relatively lower temporal weighting value when the user field of vision is changing quickly, and determine a relatively higher temporal weighting value when the user field of vision is changing slowly or not changing; and
calculate a quality metric for the user field of view of the spherical image using the weighting values, wherein calculating the quality metric comprises applying the weighting values to values for the pixels.

12. The device of claim 11, wherein to calculate the quality metric, the one or more processors are configured to calculate a peak signal to noise ratio (PSNR) value for the spherical image based on an original version of the spherical image and a reproduced version of the spherical image.

13. The device of claim 11, wherein the one or more processors are configured to determine relatively higher weighting values for pixel error values for pixels of the spherical image that are near a center of the user field of view and relatively lower weighting values for pixel error values for pixels of the spherical image that are near edges of the user field of view.

14. The device of claim 11, wherein the one or more processors are configured to form a plurality of sets of sub-images for corresponding regions of the spherical image, each of the sets of sub-images including sub-images at a plurality of different quality levels, wherein the plurality of different quality levels includes one or more of a plurality of different spatial resolutions for the sub-images or a plurality of different quantization parameters (QPs) used to encode the sub-images.

15. The device of claim 11, wherein the spherical image is partitioned into regions, and wherein the one or more processors are further configured to:
encode image data for each of the regions to form encoded image data; and
decode the encoded image data,
wherein the one or more processors are configured to calculate the quality metric based on the decoded image data.

16. The device of claim 15, wherein to encode the image data, the one or more processors are configured to:

determine requested quality levels for each of the regions; and
encode the image data for each of the regions such that the image data for each of the regions has the corresponding requested quality level using at least one of spatial resolution for the region or quantization parameter (QP) for the region.

17. The device of claim 15, wherein the spherical image comprises an original cube map projection, wherein the one or more processors are further configured to construct a reconstructed cube map projection image using the decoded image data, and wherein the one or more processors are configured to calculate the quality metric based on the reconstructed cube map projection.

18. The device of claim 11, wherein the one or more processors are configured to calculate the quality metric according to:

$$10\log_{10}\left(\frac{1}{\frac{1}{WH}\sum_{x=1}^{W}\sum_{y=1}^{H}[ErrorWeight(x, y)*(I1(x, y, t) - I2(x, y, t))]^2}\right),$$

wherein W represents a width of the field of view in pixels, H represents a height of the field of view in pixels, x represents an x coordinate of a pixel in the field of view, y represents a y coordinate of a pixel in the field of view, ErrorWeight(x, y) returns a weight value for a pixel at position (x, y) in the field of view, I1(x, y, t) represents a pixel at position (x, y) of the field of view in an original version of the spherical image occurring at time t in the video data, and I2(x, y, t) represents a pixel at position (x, y) of the field of view in a reproduced version of the spherical image occurring at time t in the video data.

19. The device of claim 11, wherein the spherical image is partitioned into regions, and wherein the one or more processors are further configured to:
downsample image data for one or more of the regions based on proximity of the corresponding regions to the field of view; and
upsample the spherical image data,
wherein the one or more processors are configured to calculate the quality metric using the upsampled image data, and
wherein the one or more processors are configured to determine the weighting values such that the weighting values correspond to the amount of downsampling applied in the corresponding region.

20. The device of claim 11, wherein the one or more processors are configured to calculate the quality metric according to:

$$10\log_{10}\left(\frac{1}{\frac{1}{WH}\sum_{x=1}^{W}\sum_{y=1}^{H}[ErrorWeight(t)*(I1(x, y, t) - I2(x, y, t))]^2}\right),$$

wherein W represents a width of the field of view in pixels, H represents a height of the field of view in pixels, x represents an x coordinate of a pixel in the field of view, y represents a y coordinate of a pixel in the field of view, ErrorWeight(t) returns a temporal weight value determined based on a speed of head movement for the spherical image occurring at time t relative to a previously displayed image, I1(x, y, t) represents a pixel at position (x, y) of the field of view in an original version of the spherical image occurring at time t in the video data, and I2(x, y, t) represents a pixel at position (x, y) of the field of view in a reproduced version of the spherical image occurring at time tin the video data.

21. A device for calculating a quality metric for video data, the device comprising:
   means for determining a user field of view for a spherical image of the video data;
   means for determining weighting values for pixels of the spherical image based on the user field of view, wherein the means for determining the weighting values further comprises means for determining temporal weighting values, wherein the means for determining the temporal weighting values comprises means for determining a relatively lower temporal weighting value when the user field of vision is changing quickly, and means for determining a relatively higher temporal weighting value when the user field of vision is changing slowly or not changing; and
   means for calculating a quality metric for the user field of view of the spherical image using the weighting values, wherein the means for calculating the quality metric comprises means for applying the weighting values to values for the pixels.

22. A non-transitory computer-readable storage medium having stored thereon instructions that, when executed, cause a processor to:
   determine a user field of view for a spherical image of the video data;
   determine weighting values for pixels of the spherical image based on the user field of view, wherein the instructions that cause the processor to determine the weighting values further comprise instructions that cause the processor to determine temporal weighting values, wherein the instructions that cause the processor to determine the temporal weighting values comprise instructions that cause the processor to determine a relatively lower temporal weighting value when the user field of vision is changing quickly, and determine a relatively higher temporal weighting value when the user field of vision is changing slowly or not changing; and
   calculate a quality metric for the user field of view of the spherical image using the weighting values, wherein the instructions that cause the processor to calculate the quality metric comprise instructions that cause the processor to apply the weighting values to values for the pixels.

23. The non-transitory computer-readable storage medium of claim 22, wherein the instructions that cause the processor to calculate the quality metric comprise instructions that cause the processor to calculate a peak signal to noise ratio (PSNR) value for the spherical image based on an original version of the spherical image and a reproduced version of the spherical image.

24. The non-transitory computer-readable storage medium of claim 22, wherein the instructions that cause the processor to determine the weighting values comprise instructions that cause the processor to determine relatively higher weighting values for pixel error values for pixels of the spherical image that are near a center of the user field of view and relatively lower weighting values for pixel error values for pixels of the spherical image that are near edges of the user field of view.

25. The non-transitory computer-readable storage medium of claim 22, further comprising instructions that cause the processor to form a plurality of sets of sub-images for corresponding regions of the spherical image, each of the sets of sub-images including sub-images at a plurality of different quality levels, wherein the plurality of different quality levels includes one or more of a plurality of different spatial resolutions for the sub-images or a plurality of different quantization parameters (QPs) used to encode the sub-images.

26. The non-transitory computer-readable storage medium of claim 22, wherein the spherical image is partitioned into regions, further comprising instructions that cause the processor to:
   encode image data for each of the regions to form encoded image data; and
   decode the encoded image data,
   wherein the instructions that cause the processor to calculate the quality metric comprise instructions that cause the processor to calculate the quality metric based on the decoded image data.

27. The non-transitory The computer-readable storage medium of claim 22, wherein the instructions that cause the processor to calculate the quality metric comprise instructions that cause the processor to calculate the quality metric according to:

$$10\log_{10}\left(\frac{1}{\frac{1}{WH}\sum_{x=1}^{W}\sum_{y=1}^{H}[ErrorWeight(x,y)*(I1(x,y,t)-I2(x,y,t))]^2}\right),$$

wherein W represents a width of the field of view in pixels, H represents a height of the field of view in pixels, x represents an x coordinate of a pixel in the field of view, y represents a y coordinate of a pixel in the field of view, ErrorWeight(x, y) returns a weight value for a pixel at position (x, y) in the field of view, I1(x, y, t) represents a pixel at position (x, y) of the field of view in an original version of the spherical image occurring at time t in the video data, and I2(x, y, t) represents a pixel at position (x, y) of the field of view in a reproduced version of the spherical image occurring at time tin the video data.

28. The non-transitory computer-readable storage medium of claim 22, wherein the spherical image is partitioned into regions, further comprising instructions that cause the processor to:
   downsample image data for one or more of the regions based on proximity of the corresponding regions to the field of view; and
   upsample the spherical image data, wherein calculating the quality metric comprises calculating the quality metric using the upsampled image data,
   wherein the instructions that cause the processor to determine the weighting values comprise instructions that cause the processor to determine the weighting values such that the weighting values correspond to the amount of downsampling applied in the corresponding region.

29. The non-transitory computer-readable storage medium of claim 22, wherein the instructions that cause the processor to calculate the quality metric comprise instructions that cause the processor to calculate the quality metric according to:

$$10\log_{10}\left(\frac{1}{\frac{1}{WH}\sum_{x=1}^{W}\sum_{y=1}^{H}[ErrorWeight(t)*(I1(x,y,t)-I2(x,y,t))]^2}\right),$$

wherein W represents a width of the field of view in pixels, H represents a height of the field of view in pixels, x represents an x coordinate of a pixel in the field of view, y represents a y coordinate of a pixel in the field of view, ErrorWeight(t) returns a temporal weight value determined based on a speed of head movement for the spherical image occurring at time t relative to a previously displayed image, $I1(x, y, t)$ represents a pixel at position $(x, y)$ of the field of view in an original version of the spherical image occurring at time t in the video data, and $I2(x, y, t)$ represents a pixel at position $(x, y)$ of the field of view in a reproduced version of the spherical image occurring at time t in the video data.

* * * * *